United States Patent
Choi et al.

(10) Patent No.: US 9,088,954 B2
(45) Date of Patent: Jul. 21, 2015

(54) METHOD AND APPARATUS FOR TRANSMITTING A SIGNAL FOR A LOCATION BASED-SERVICE IN A WIRELESS COMMUNICATION SYSTEM, AND METHOD AND APPARATUS FOR LOCATING A TERMINAL THAT USES THE SIGNAL

(75) Inventors: Jin Soo Choi, Anyang-si (KR); Han Gyu Cho, Anyang-si (KR); Jin Sam Kwak, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 676 days.

(21) Appl. No.: 13/391,162

(22) PCT Filed: Jul. 20, 2010

(86) PCT No.: PCT/KR2010/004729
§ 371 (c)(1),
(2), (4) Date: Feb. 17, 2012

(87) PCT Pub. No.: WO2011/021782
PCT Pub. Date: Feb. 24, 2011

(65) Prior Publication Data
US 2012/0157117 A1 Jun. 21, 2012

Related U.S. Application Data

(60) Provisional application No. 61/235,347, filed on Aug. 19, 2009, provisional application No. 61/242,368, filed on Sep. 14, 2009, provisional application No. 61/255,106, filed on Oct. 27, 2009, provisional (Continued)

(51) Int. Cl.
*H04W 24/00* (2009.01)
*H04W 64/00* (2009.01)
*H04W 4/02* (2009.01)

(52) U.S. Cl.
CPC ............... *H04W 64/00* (2013.01); *H04W 4/02* (2013.01)

(58) Field of Classification Search
CPC ............. H04W 4/00; H04W 4/02–4/046; H04W 64/00–64/006; H04W 4/22
USPC ........ 455/456.1–457, 404.1; 342/357.1, 450, 342/457, 357.2; 340/988; 701/207, 213, 701/214, 216, 400, 408, 410, 411, 445
See application file for complete search history.

(56) References Cited

U.S. PATENT DOCUMENTS 5,510,801 A  4/1996 Engelbrecht et al.
5,815,538 A * 9/1998 Grell et al. .................... 375/356

(Continued)

FOREIGN PATENT DOCUMENTS

CN  101032183 A  9/2007
CN  101378532 A  3/2009

(Continued)

OTHER PUBLICATIONS

Huawei, "Consideration on PRS pattern design" Discussion & Decision, 3GPP TSG RAN WG1#57b, Los Angeles, US, Jun. 29-Jul. 3, 2009, R1-092354, pp. 1-10.

*Primary Examiner* — Steve D Agosta
(74) *Attorney, Agent, or Firm* — Birch, Stewart, Kolasch & Birch, LLP

(57) ABSTRACT

The present invention relates to a wireless communication system. In particular, for the transmission of a locating zone configured across one or more superframes for transmitting a locating synchronizing signal for determining the location of a terminal in a wireless communication system, the wireless communication system of the present invention transmits, to a terminal, a superframe header including information indicating whether or not to transmit the locating zone. Thus, the terminal can discern a terminal belonging to the location zone form among superframes received by the terminal.

8 Claims, 23 Drawing Sheets

Related U.S. Application Data application No. 61/257,045, filed on Nov. 2, 2009, provisional application No. 61/259,610, filed on Nov. 9, 2009, provisional application No. 61/347,455, filed on May 24, 2010, provisional application No. 61/357,533, filed on Jun. 23, 2010.

(56) References Cited

U.S. PATENT DOCUMENTS

| | | | |
|---|---|---|---|
| 8,144,682 B2* | 3/2012 | Soliman et al. | 370/347 |
| 2003/0122705 A1 | 7/2003 | Marko et al. | |
| 2006/0050625 A1* | 3/2006 | Krasner | 370/208 |
| 2006/0215618 A1 | 9/2006 | Soliman et al. | |
| 2007/0021122 A1 | 1/2007 | Lane et al. | |
| 2008/0130479 A1* | 6/2008 | Li et al. | 370/203 |
| 2008/0261623 A1* | 10/2008 | Etemad et al. | 455/456.2 |
| 2009/0022235 A1* | 1/2009 | Zhang et al. | 375/260 |
| 2009/0124265 A1* | 5/2009 | Black et al. | 455/456.1 |
| 2009/0203386 A1* | 8/2009 | Edge et al. | 455/456.1 |
| 2009/0323596 A1 | 12/2009 | Wigren et al. | |
| 2010/0165942 A1* | 7/2010 | Liao et al. | 370/329 |
| 2011/0158200 A1* | 6/2011 | Bachu et al. | 370/330 |

FOREIGN PATENT DOCUMENTS

| | | |
|---|---|---|
| JP | 2008-537387 A | 9/2008 |
| JP | 2009-503935 A | 1/2009 |
| JP | 2009-503992 A | 1/2009 |
| WO | WO 2010/104436 A1 | 9/2010 |
| WO | WO 2011/003030 A1 | 1/2011 |

* cited by examiner

METHOD AND APPARATUS FOR TRANSMITTING A SIGNAL FOR A LOCATION BASED-SERVICE IN A WIRELESS COMMUNICATION SYSTEM, AND METHOD AND APPARATUS FOR LOCATING A TERMINAL THAT USES THE SIGNAL

This application is the National Phase of PCT/KR 2010/004729 filed on Jul. 20, 2010, which claims priority under 35 U.S.C. §119 (e) to U.S. Provisional Application No(s). 61/235,347 filed on Aug. 19, 2009, 61/242,368, filed on Sep. 14, 2009, 61/255,106 filed on Oct. 27, 2009, 61/257,045 filed on Nov. 2, 2009 and 61/259,610 filed on Nov. 9, 2009, all of which are hereby expressly incorporated by reference into the present application. In addition, PCT/KR 2010/004729 also claims priority under 35 U.S.C. §119(e) to U.S. Provisional Application Nos. 61/347,455 filed on May 24, 2010 and 61/357,533 filed on Jun. 23, 2010.

FIELD OF THE INVENTION

The present invention relates to a wireless communication system, and more particularly, to a method and an apparatus for transmitting signals at a base station for location based service in a wireless communication system, and a method and an apparatus for measuring a location of a user equipment by receiving the signals.

BACKGROUND ART

A geographical location of a user equipment is calculated by basically measuring a delay time of signals transmitted from a plurality of cells. Accordingly, in order to measure a location of a user equipment, at least three or more signals are required. Based on this, various methods for calculating a location of a user equipment are provided. It is general that an observed time difference of arrival (OTDOA) scheme is mainly used.

FIG. 1 is a conceptual view illustrating an OTDOA scheme for measuring a location of a user equipment.

Referring to FIG. 1, the OTDOA scheme is to measure a location of a user equipment by using the difference in timing of signals transmitted from respective cells to the user equipment. The user equipment measures a delay time of each signal received from each cell and reports the measured delay times to a serving cell or an anchor cell. The serving cell measures a location of the corresponding user equipment by using the reported delay times.

Meanwhile, in order to provide a communication service of high quality, the need of a location measurement scheme for determining a location of a user equipment within a network and/or locations of entities related to the user equipment more exactly has been increased. In this respect, an advanced method for determining a location while minimizing an effect on a structure of an existing radio frame should be provided.

DISCLOSURE OF INVENTION

Technical Problem

An object of the present invention is to provide a method for transmitting a location measurement signal for location based service while minimizing an effect on a structure of an existing radio frame.

Another object of the present invention is to provide a method for allocating a location measurement signal for location based service to a superframe while minimizing an effect on a reference signal and a control signal, which are allocated to an existing radio frame.

Other object of the present invention is to provide a method for transmitting location information of a location to which the location measurement signal is transmitted, to a user equipment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The present invention relates to a wireless communication system. More particularly, the present invention provides a method for transmitting a superframe header including information indicating whether or not a location measurement zone configured to span one or more superframes is transmitted to a user equipment in order to transmit a synchronization signal for location measurement for determining a location of the user equipment.

In an aspect of the present invention, a method for transmitting, by a base station, a location measurement signal for a location based service (LBS) of a wireless communication system is provided. The method comprises transmitting a synchronization signal for location measurement in at least one symbol from among first symbols of frames within a location measurement zone configured to span one or more superframes; and a superframe header (SFH) including information indicating whether or not the location measurement zone is transmitted.

In another aspect of the present invention, a base station of transmitting a location measurement signal for a location based service (LBS) of a wireless communication system is provided. The base station comprises a transmitter configured to transmit a radio signal to a user equipment, is configured to control the transmitter to transmit a synchronization signal for location measurement in at least one symbol from among first symbols of frames within a location measurement zone configured to span one or more superframes; and is configured to transmit a superframe header (SFH) including information indicating whether or not the location measurement zone is transmitted.

In still another aspect of the present invention, a method for measuring, by a user equipment, location related information for determining a location of the user equipment in a wireless communication system is provided. The method comprises receiving, from each of a plurality of base stations, a superframe header (SFH) including information indicating that a location measurement zone configured to span one or more superframes is transmitted; and receiving a corresponding synchronization signal for location measurement on a corresponding location measurement zone of each of the plurality of base stations; and measuring the location related information based on the synchronization signals for location measurement which are received from the plurality of the plurality of base stations, wherein the synchronization signal for location measurement from each of the plurality of base stations is received in at least one symbol from among first symbols of frames within a location measurement zone of a corresponding base station.

In further still another aspect of the present invention, a user equipment for measuring location related information for determining a location of the user equipment in a wireless communication system is provided. The user equipment comprises a receiver configured to receive, from each of a plurality of base stations, a superframe header (SFH) including information indicating that a location measurement zone configured to span one or more superframes is transmitted, and configured to receive a corresponding synchronization signal for location measurement on a corresponding location measurement zone of each of the plurality of base stations; and a processor configured to measure the location related information based on the synchronization signals for location measurement which are received from the plurality of the plurality of base stations, wherein receiver is configured to receive the synchronization signal for location measurement from each of the plurality of base stations in at least one symbol from among first symbols of frames within a location measurement zone of a corresponding base station.

In each aspect of the present invention, the superframe header may include information indicating a transmission period of the location measurement zone.

In each aspect of the present invention, the at least one symbol may be a predetermined symbol from among first symbols of first, third and fourth frames in the superframe.

In each aspect of the present invention, the at least one symbol may divided into a plurality of carrier sets, and the synchronization signal is transmitted on at least one of the plurality of carriers sets, and wherein the at least one symbol and the at least one carrier set on which the location measurement signal is transmitted may be determined based on a cell identity assigned to the base station.

In each aspect of the present invention, the predetermined symbol may be muted in a location measurement zone period during which a neighboring base station transmits a synchronization signal for location measurement.

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantageous Effects of Invention

According to the embodiments of the present invention, it is advantageous in that it is possible to transmit a location measurement signal for location based service while minimizing an effect on a structure of an existing radio frame.

Also, according to the embodiments of the present invention, it is advantageous in that it is possible to allocate a location measurement signal for location based service to a superframe while minimizing an effect on a reference signal and a control signal, which are allocated to an existing radio frame.

Also, according to the embodiments of the present invention, it is advantageous in that it is possible to reduce inter-cell interference of cells that take part in location measurement, thereby improving location measurement performance of the user equipment based on the location measurement signal.

Finally, according to the embodiments of the present invention, it is advantageous in that information indicating a superframe on which the location measurement signal is transmitted, is signaled to the user equipment, whereby the user equipment can easily recognize the corresponding superframe among a plurality of superframes.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

MODE FOR THE INVENTION

Figure 1:
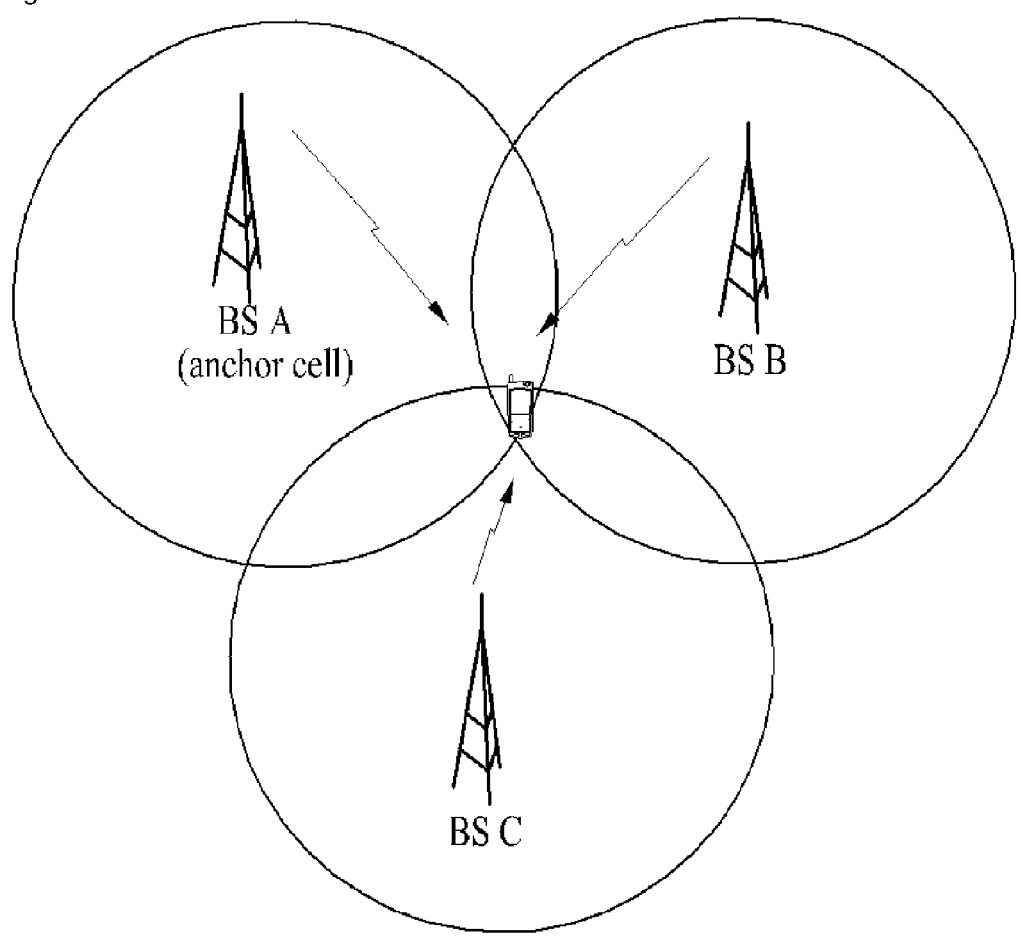
FIG. 1 is a conceptual view illustrating an OTDOA scheme for measuring a location of a user equipment.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems except unique features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a terminal equipment denotes a mobile or fixed type user terminal. Examples of the terminal equipment include various equipments that transmit and receive user data and/or various kinds of control information to and from a base station. The terminal equipment may be referred to as a user equipment (UE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

A wireless communication system to which the embodiments of the present invention are applied includes a plurality of base stations. Each base station provides a communication service to user equipment(s) located in a specific local zone (generally referred to as a cell). The cell can be divided into a plurality of local zones (referred to as sectors).

Hereinafter, LBS superframe/frame/subframe/symbol represents superframe/frame/subframe/symbol to which a reference signal for location based service (LBS) is allocated or can be allocated. The reference signal for LBS or LBS location measurement signal means a special waveform signal transmitted from a base station for location specific measurement that enables more accurate location measurement. The base station according to the embodiments of the present invention, which will be described later, can signal a location of a special waveform to a user equipment. The user equipment can detect the special waveform transmitted in accordance with the embodiments of the present invention, perform related measurement, and report the measured result to the base station.

Also, if a special signal within superframe/frame/subframe/symbol is not transmitted from its transmission location, it will be expressed that transmission of the special signal has been dropped, muted, null or blanked.

Meanwhile, in the present invention, if the special signal is allocated to superframe/frame/subframe/symbol/carrier/subcarrier, it means that the special signal is transmitted through the corresponding carrier/subcarrier during a period/timing of the corresponding superframe/frame/subframe/symbol.

As described in FIG. 1, in order to measure a location of a user equipment, signal transmission/arrival timing from each base station to the user equipment can be used. Examples of signals used for timing measurement include downlink pilot and advanced preamble (A-preamble) in a downlink, and also include uplink pilot and ranging channel in an uplink. Hereinafter, a method for allocating a location measurement preamble for more accurate location measurement while minimizing an effect on transmission of existing system and control information and allocation/measurement of existing A-preamble and a base station for implementing the method, and a method for performing location measurement by receiving a location measurement preamble for LBS and a user equipment for implementing the method will be described.

Figure 2:
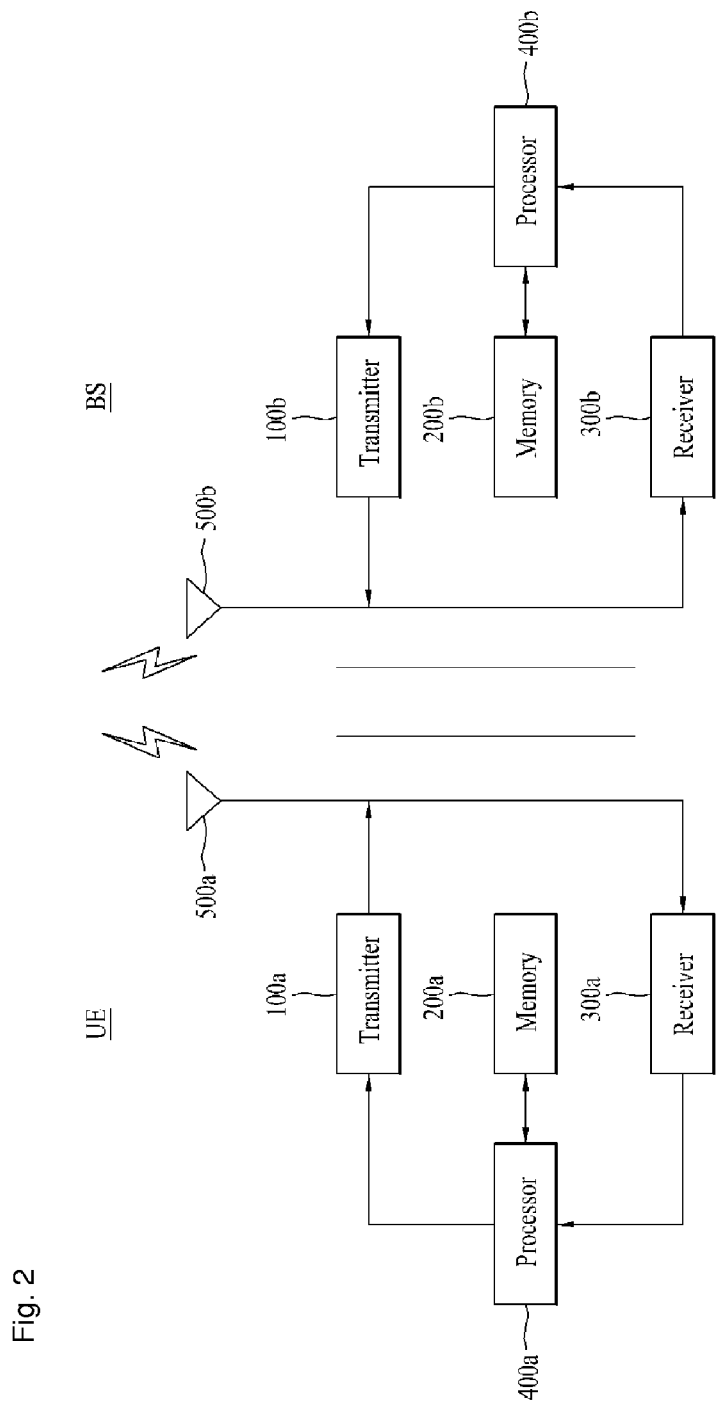
FIG. 2 is a block diagram illustrating a user equipment and a base station for implementing the present invention.

FIG. 2 is a block diagram illustrating a user equipment and a base station for implementing the present invention.

The user equipment serves as a transmitting apparatus on the uplink and as a receiving apparatus on the downlink. By contrast, the base station may serve as a receiving apparatus on the uplink and as a transmitting apparatus on the downlink.

The user equipment and the base station include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The user equipment and the base station further include processors 400a and 400b, respectively, which are adapted to perform the present invention by controlling the components of the user equipment and the base station, such as the transmitters 100a and 100b, the receivers 300a and 300b, and the memories 200a and 200b. The transmitter 100a, the memory 200a, the receiver 300a, and the processor 400a in the user equipment may be configured as independent components by separate chips or their separate chips may be incorporated into a single chip. Likewise, the transmitter 100b, the memory 200b, the receiver 300b, and the processor 400b in the base station may be configured as independent components on separate chips or their separate chips may be incorporated into a single chip. The transmitter and the receiver may be configured as a single transceiver in the user equipment or the base station.

The antennas 500a and 500b transmit signals generated from the transmitters 100a and 100b to the outside, or transfer radio signals received from the outside to the receivers 300a and 300b. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the user equipment and the base station. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b. The transmitters 100a and 100b and the receivers 300a and 300b of the user equipment and the base station may be configured in different manners depending on the procedures of processing transmitted signals and received signals.

Figure 3:
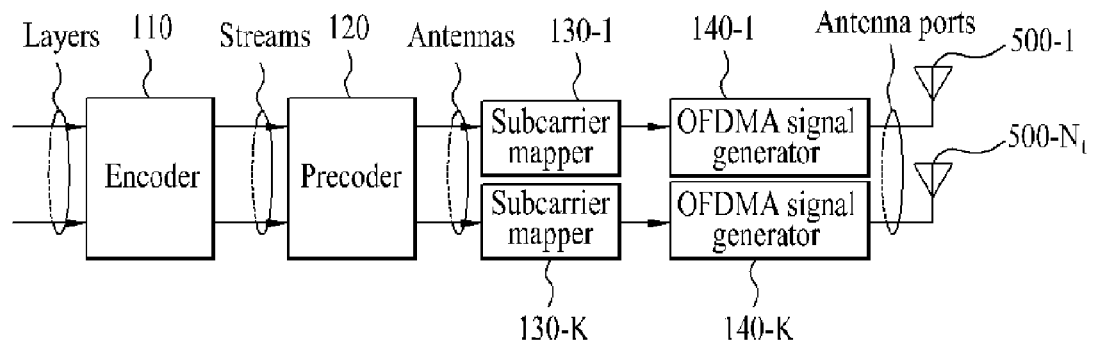
FIG. 3 is a block diagram illustrating an example of a transmitter in each of the user equipment and the base station.

FIG. 3 is a block diagram illustrating an example of a transmitter in each of the user equipment and the base station. Operations of the transmitters 100a and 100b will be described below in more detail with reference to FIG. 3.

Referring to FIG. 3, each of the transmitters 100a and 100b includes an encoder 110, a precoder 120, subcarrier mappers 130-1 to 130-K, Orthogonal Frequency Division Multiplexing (OFDM) signal generators 140-1 to 140-K. Each of the transmitter 100a and 100b is connected to $N_t$ transmission antennas 500-1 to 500-$N_t$.

The encoder 110 encodes a transmission data stream in accordance with a predetermined coding scheme to form coded data and modulates the coded data to be arranged as symbols representing positions on a signal constellation in a predetermined modulation scheme. The modulation scheme may be, but not limited to, any of m-Phase Shift Keying (m-PKS) and m-Quadrature Amplitude Modulation (m-QAM). For modulating the coded data, the encoder 110 may have an independent modulation module. In the mean time, the encoder 110 may define the layers of the input symbols such that the precoder 120 can distribute antenna-specific symbols to corresponding antenna paths. A layer refers to an information path input to the precoder 120, and the information path before the precoder 120 may be referred to as a virtual antenna or layer. To define the layers of the symbols, the encoder 110 may be provided with a layer mapper configured as an independent module.

The precoder 120 outputs antenna-specific symbols to the subcarrier mappers 130-1 to 130-K by processing the received symbols in accordance with to a MIMO scheme according to the multiple transmission antennas 500-1 to 500-$N_t$. Mapping of the MIMO streams to the antennas 500-1 to 500-$N_t$ is performed by the precoder 120. Specifically, the precoder 120 multiplies the output x of the encoder 11 by an $N_t \times M_t$ precoding matrix W. The output of the precoder 120 may be represented as an $N_t \times N_F$ matrix z.

The subcarrier mappers 130-1 to 130-K allocate the antenna-specific symbols to appropriate subcarriers and multiplex them according to users. The OFDM signal generators 140-1 to 140-K output OFDM symbols by modulating the antenna-specific symbols according to OFDM modulation scheme. For example, the OFDM signal generators 140-1 to 140-K may perform Inverse Fast Fourier Transform (IFFT) for the antenna-specific symbols and insert a Cyclic Prefix (CP) into the resulting IFFT time-domain symbol. The OFDM symbol is transmitted to the receiving apparatus through the transmission antennas 500-1 to 500-$N_t$.

The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include N reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module.

Although it has been described in FIG. 2 and FIG. 3 that each of the transmitters 110a and 100b includes the encoder 110, the precoder 120, the subcarrier mappers 130-1 to 130-K, and the OFDMA signal generators 140-1 to 140-K, the processors 400a and 400b of the transmitting apparatus may include the encoder 110, the precoder 120, the subcarrier mappers 130-1 to 130-K, and the OFDMA signal generators 140-1 to 140-K. Likewise, although it has been described in FIG. 2 and FIG. 3 that each of the receivers 300a and 300b includes the signal recoverer, the multiplexer, and the channel demodulator, the processors 400a and 400b of the receiving apparatus may include the signal recoverer, the multiplexer, and the channel demodulator. Hereinafter, for convenience of description, the encoder 110, the precoder 120, the subcarrier mappers 130-1 to 130-K, and the OFDMA signal generators 140-1 to 140-K are included in the transmitters 100a and 100b separated from the processors 400a and 400b that control the operations of the encoder 110, the precoder 120, the subcarrier mappers 130-1 to 130-K, and the OFDMA signal generators 140-1 to 140-K. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the encoder 110, the precoder 120, the subcarrier mappers 130-1 to 130-K, and the OFDMA signal generators 140-1 to 140-K are included in the processors 400a and 400b and the case where the signal recoverer, the multiplexer, and the channel demodulator are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

In the mean time, the processor 400b in the base station of the present invention sets superframe/frame/subframe for LBS in accordance with the embodiments of the present invention, which will be described later, and controls the transmitter 100b to allocate a location measurement signal for LBS to predetermined frequency/time resources within the superframe/frame/subframe.

Also, the processor 400a in the user equipment of the present invention can be configured to measure the location of the user equipment within the cell of each base station that has transmitted the location measurement signal for LBS, based on the location measurement signals for LBS allocated to the predetermined frequency/time resources in accordance with the embodiments of the present invention. Also, the processor 400a in the user equipment can control the transmitter 400a of the user equipment by feeding the measured result back to the base station that has transmitted the location measurement signal for LBS. The processor 400a or the receiver 300a of the user equipment can be configured to have a separate module that measures the location by using location measurement signals for LBS.

Figure 4:
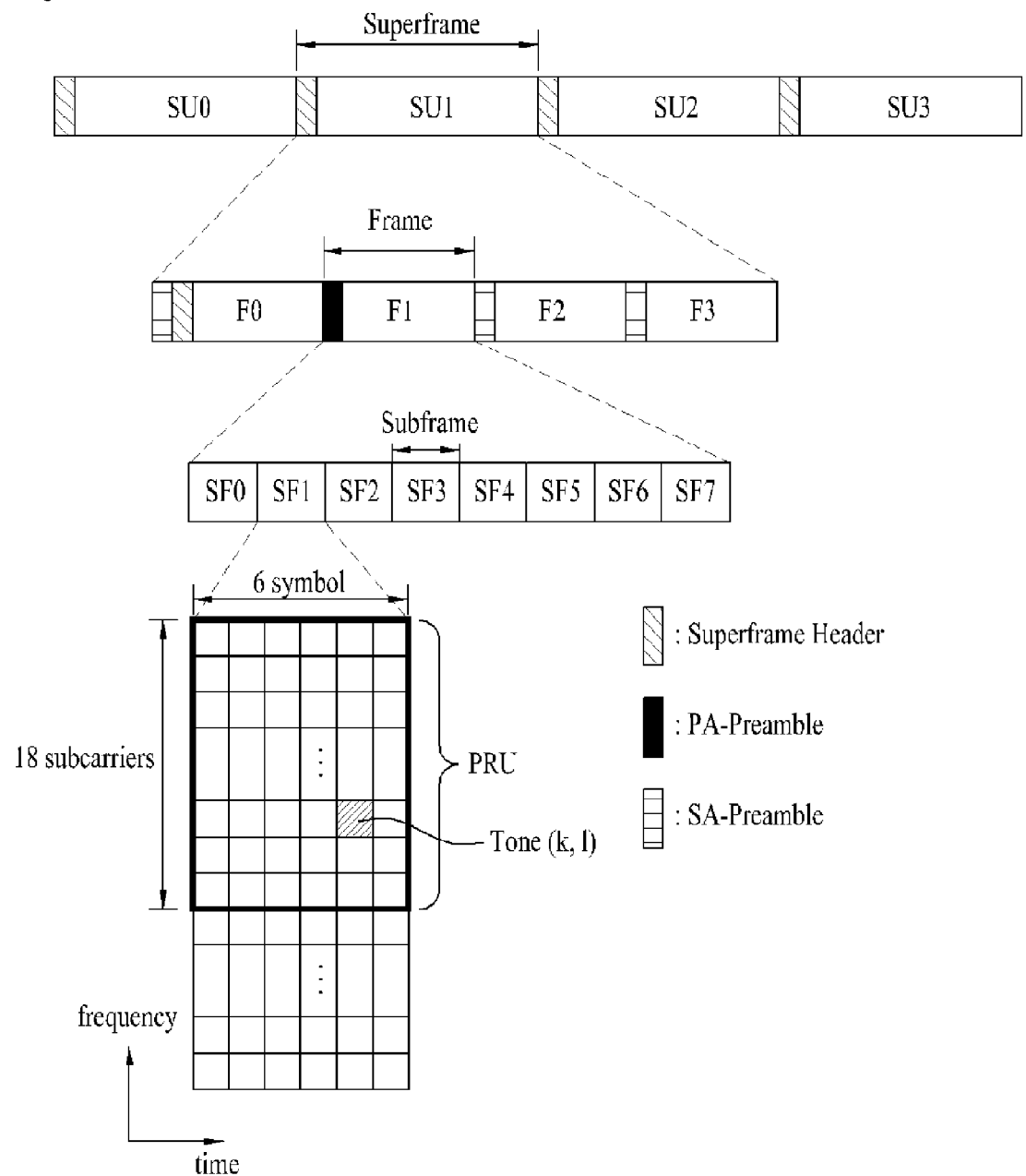
FIG. 4 is a diagram illustrating an example of a radio frame used in a wireless communication system.

FIG. 4 illustrates an example of a structure of a radio frame used in the wireless communication system. Especially, FIG. 4 illustrates a structure of a radio frame of the IEEE 802.16 system. The radio frame structure can be applied to a frequency division duplex (FDD) mode, a half frequency division duplex (H-FDD) mode, and a time division duplex (TDD) mode.

Referring to FIG. 4, the radio frame includes superframes SU0 to SU3 of 20 ms that support a bandwidths of 5 MHz, 8.75 MHz, 10 MHz or 20 MHz. Each superframe includes four frames F0 to F3 of 5 ms having the same size, and starts with a superframe header (SFH). The superframe header carries essential system parameter and system configuration information. The superframe header can be located within the first subframe of the superframe. The superframe header can be classified into a primary superframe header (P-SFH) and a secondary superframe header (S-SFH). The P-SFH is transmitted per superframe. The S-SFH may be transmitted per superframe. The superframe header can include a broadcast channel.

One frame can include eight subframes SF0 to SF7. The subframe is allocated for downlink or uplink transmission. The frame can be configured differently depending on duplex modes. For example, since downlink transmission and uplink transmission are identified by frequency in the FDD mode, one frame includes either downlink subframes or uplink subframes. In the FDD mode, an idle time can exist at the end of each frame. On the other hand, since downlink transmission and uplink transmission are identified by time in the TDD mode, subframes within the frame are classified into a downlink subframe and an uplink subframe. In the TDD mode, an idle time referred to as a transmit/receive transition gap (TTG) exists while the downlink is being changed to the uplink. Also, idle time referred to as a receive/transmit transition gap (RTG) exists while the uplink is being changed to the downlink.

The subframe is a unit of a transmission time interval (TTI). In other words, one TTI is defined by one or more subframes. In general, basic TTI is set to one subframe. The TTI means a time interval that a physical layer transmits coded packets through a radio interface. Accordingly, one subframe or a plurality of neighboring subframes can be used for transmission of data packets.

The subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDMA symbols included in one subframe can be varied depending on channel bandwidth and cyclic prefix (CP) length. A type of the subframe can be defined depending on the number of OFDMA symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes. For convenience of description, the subframe type-1 that includes six OFDMA symbols is described in the embodiments of the present invention. However, the embodiments of the present invention, which will be described later, can be applied to the other types of subframes in the same manner.

In the frequency domain, the OFDMA symbol includes a plurality of subcarriers, and the number of subcarriers is determined depending on the size of fast fourier transform (FFT). The subcarriers can be classified into data subcarriers for data transmission, pilot subcarriers for channel measurement, and null subcarriers for guard band and DC components. Examples of parameters for the OFDMA symbols include BW, $N_{used}$, n, G, etc. The BW is a nominal channel bandwidth. $N_{used}$ is the number of subcarriers used for signal transmission. Also, n is a sampling factor, and determines subcarrier spacing and useful symbol time together with BW and $N_{used}$. G is a ratio between CP time and useful time.

In the frequency domain, resources can be grouped in a predetermined number of subcarriers. A group comprised of a predetermined number of subcarriers within one subframe is referred to as a physical resource unit (PRU). The subframe includes a plurality of physical resource units (PRUs) in the frequency domain. The PRU is a basic unit for resource allocation, and includes a plurality of continuous OFDMA symbols in the time domain and a plurality of continuous subcarriers in the frequency domain. For example, the number of OFDMA symbols within the PRU may be the same as the number of OFDMA symbols included in the subframe. Accordingly, the number of OFDMA symbols within the PRU can be determined depending on the type of the subframe. In the mean time, the number of subcarriers within the PRU may be 18. In this case, the PRU includes 6 OFDM symbols×18 subcarriers. The PRU can be denoted as a distributed resource unit (DRU) or a contiguous resource unit (CRU) depending on a resource allocation type. A basic permutation unit of a downlink DRU is a tone-pair that includes two subcarriers and one symbol. In case of the subframe type-1, one PRU includes 108 tones. A tone can be also referred to as a resource element.

The subframe can be divided into at least one frequency partition (FP) in a frequency domain. The frequency partition can be used for fractional frequency reuse (FFR). Each frequency partition includes one or more PRUs. Distributed resource allocation and/or contiguous resource allocation can be applied to each frequency partition. A logical resource unit (LRU) is a basic logical unit for distributed resource allocation and contiguous resource allocation.

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

In the mean time, the current IEEE 802.16m standard regulates four synchronization signals to be transmitted on one superframe. For example, in the IEEE 802.16m system, a downlink synchronization signal includes a primary synchronization signal and a secondary synchronization signal, wherein the primary synchronization signal includes a primary advanced preamble (PA-preamble) and the secondary synchronization signal includes a secondary advanced preamble (SA-preamble). In the FDD mode and the TDD mode, each of the PA-preamble and the SA-preamble is located at the first symbol of each frame. In more detail, the PA-preamble is located at the first symbol of the second frame F1 within the superframe, and the SA-preamble is located at the first symbol of the other three frames F0, F2 and F3 within the superframe. The PA-preamble carries system bandwidth and carrier configuration information. Accordingly, the user equipment can acquire system bandwidth and carrier configuration information from the PA-preamble. Hereinafter, a symbol to/on which the PA-preamble is allocated/transmitted will be referred to as a PA-preamble symbol.

The SA-preamble carries cell ID of the base station. The SA-preamble is respectively transmitted on the first symbols within the first, third and fourth frames during one superframe. The user equipment detects cell ID of the corresponding base station or performs cell scanning during handover by accumulating the SA-preamble transmitted three times within one superframe. Hereinafter, the first symbols within the first, third and fourth frames, to/on which the existing SA-preamble is allocated/transmitted, will be referred to as (existing) SA-preamble symbols.

The SA-preamble can be used to allow the user equipment to measure relative delay (RD), round trip delay (RTD), and received signal strength indication (RSSI). The RD, RTD, and RSSI are parameters that can also be used to measure the location of the base station that has transmitted the SA-preamble. However, in the case that the existing SA-preamble is used for location measurement, since the existing system supports three reuse patterns only for SA-preamble transmission. In this case, if a lot of neighboring cells for signal transmission exist, a problem occurs in that it is difficult to identify signals transmitted from the neighboring cells. Also, a problem occurs in that it is difficult for the neighboring cells to turn off the corresponding preamble when a serving cell transmits the preamble. For this reason, it is difficult for the user equipment to measure location related signals such as RD, RTD and RSSI with higher accuracy by using the existing SA-preamble. Accordingly, the present invention suggests that the user equipment detects a lot of base stations if possible and acquires exact transmission time/arrival time of location measurement signals transmitted from the base stations, whereby synchronization signals that can determine the exact location of the user equipment are transmitted as location measurement signals for LBS. Hereinafter, a synchronization signal transmitted as the location measurement signal for LBS will be referred to as LBS-preamble or LBS location beacon in the embodiments of the present invention.

In the mean time, in order to minimize an effect on the system due to allocation of the LBS location beacon, according to the present invention, the LBS location beacon is transmitted on only predetermined certain number of superframe(s) not all superframes. Hereinafter, an interval where one base station transmits a location measurement signal for a user equipment will be referred to as an LBS zone. In other words, the LBS zone is defined to transmit the LBS location beacon received by the user equipment. The LBS zone configured in accordance with the embodiments of the present invention, which will be described later, enables measurement of location related parameters (RD, RTD, RSSI, etc.) with higher accuracy. The present invention includes an embodiment that the LBS zone spans one superframe and another embodiment that the LBS zone spans a plurality of contiguous superframes. The present invention further includes an embodiment that the number of superframes constituting an LBS zone is fixed and an embodiment that the number of superframes constituting an LBS zone is not fixed.

If the number of superframes constituting an LBS zone is not fixed, the base station can signal the number of superframes constituting the LBS zone to the user equipment through a MAC control message, the SFH or the PA-preamble. Even in the case that the number of superframes that belong to the LBS zone is fixed, information on the number of superframes that belong to the LBS zone can be signaled to the user equipment through the MAC control message, the SFH or the PA-preamble. The processor 400*b* of the base station can generate the MAC control message, the SFH or the PA-preamble, which includes information related to the number of superframes constituting the LBS zone.

FIG. 5 to FIG. 8 are diagrams illustrating embodiments for allocating a location based service (LBS) zone to a radio frame.

Figure 5:
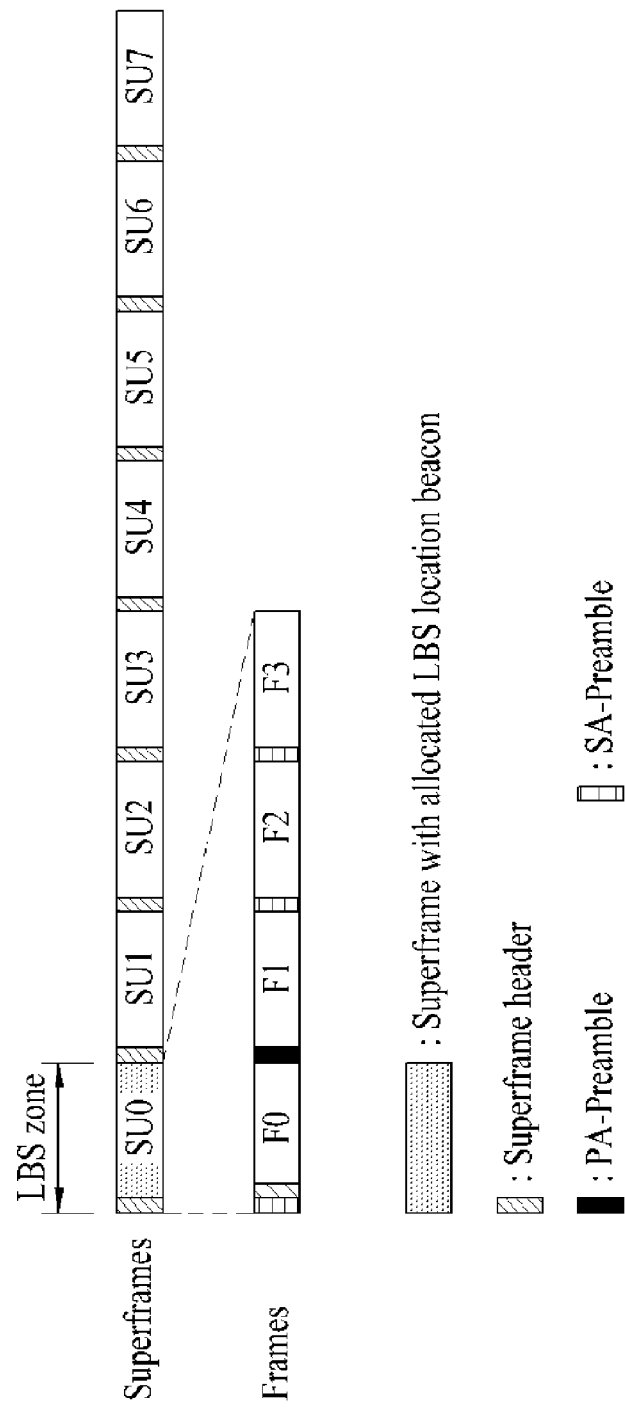
FIG. 5 to FIG. 8 are diagrams illustrating embodiments for allocating a location based service (LBS) zone to a radio frame.

In FIG. 5, one superframe configures one LBS zone. In this case, the base station can allocate a location measurement signal for LBS to the superframe SU0 to which the LBS zone belongs. The user equipment performs location measurement based on the location measurement signal for LBS transmitted on one superframe per base station, or performs location measurement by accumulating the location measurement signal for LBS within a plurality of superframes collected per base station for an enough time.

Figure 6:
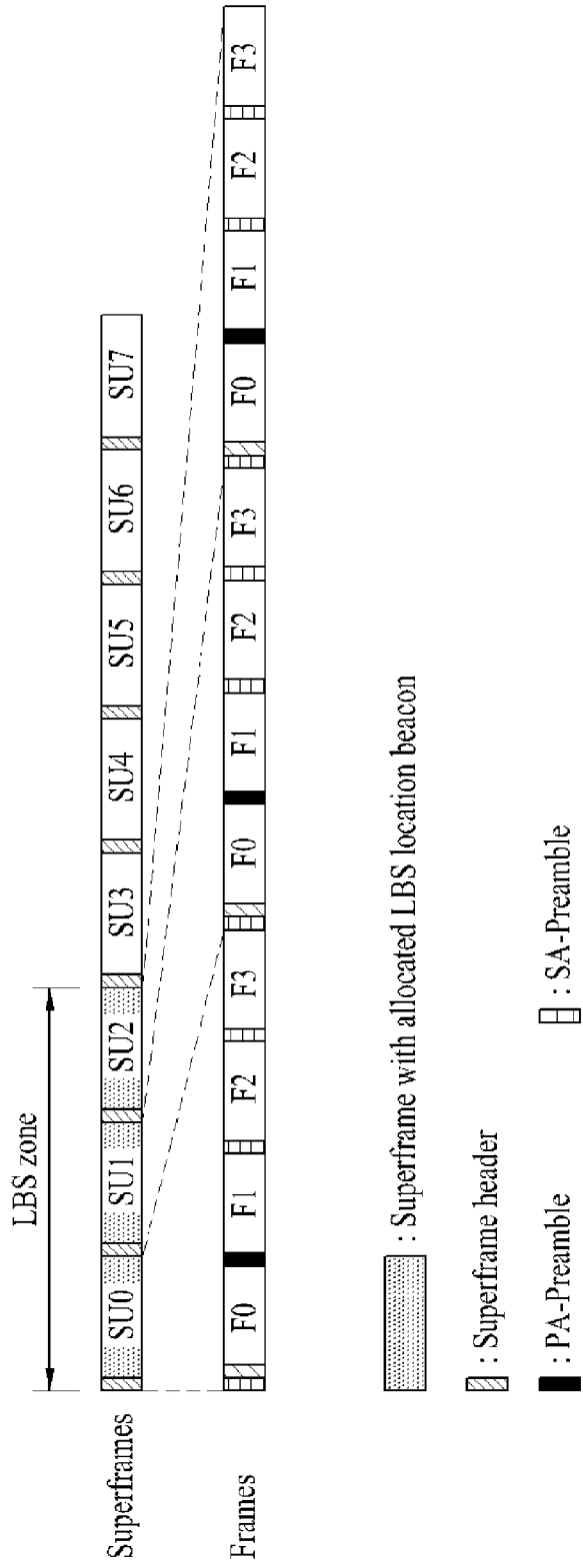

In FIG. 6, a plurality of contiguous superframes configure one LBS zone. In this case, the base station can allocate a location measurement signal for LBS to the plurality of contiguous superframes SU0 to SU2 to which the LBS zone belongs. The user equipment performs location measurement based on the location measurement signal for LBS transmitted through the superframes to which one LBS zone per base station belongs, or performs location measurement by accumulating the location measurement signal for LBS within a plurality of LBS zones per base station for an enough time. Although FIG. 6 illustrates that three superframes are included in one LBS zone, this is only exemplary. It will be apparent that several superframes such as two superframes, four superframes, five superframes and etc. may be included in one LBS zone.

In the embodiments of FIG. 5 and FIG. 6, the base station transmits one LBS zone for a certain time interval. Namely, if one LBS zone is transmitted, then a general superframe is transmitted for a certain time interval. The user equipment can perform location measurement by collecting a plurality of LBS zones transmitted for a predetermined time and accumulating the location measurement signals transmitted on the plurality of LBS zones.

Figure 7:
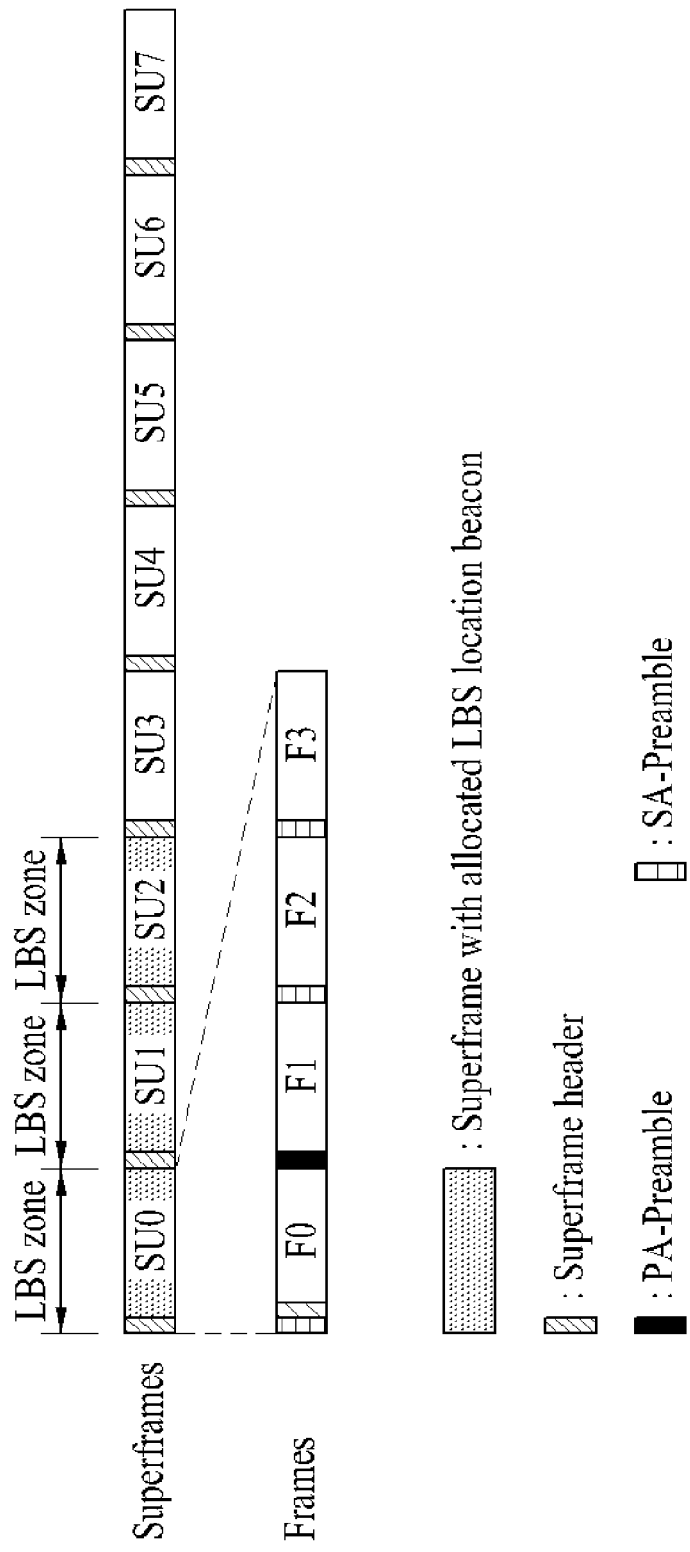
Figure 8:
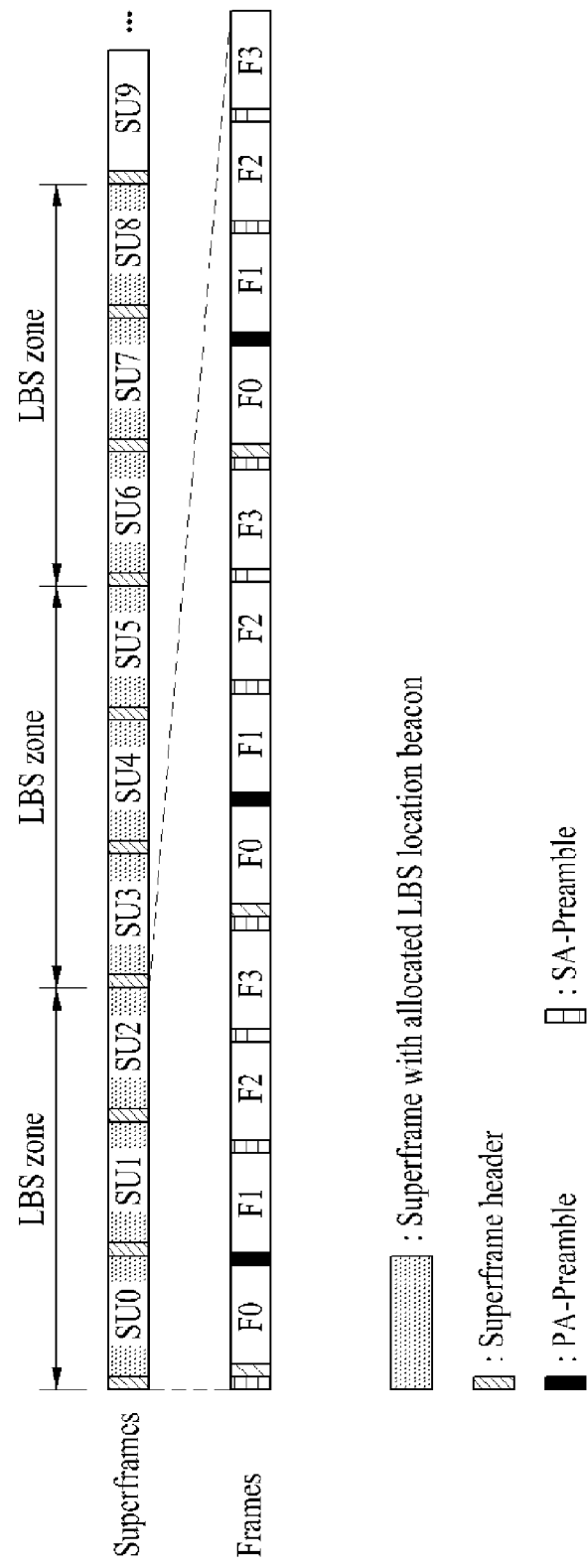

On the other hand, in the embodiments of FIG. 7 and FIG. 8, the LBS zones to which the same location measurement signals are allocated are transmitted continuously. FIG. 7 illustrates that the LBS zone configured by one superframe is transmitted continuously. FIG. 8 illustrates that the LBS zone configured by a plurality of contiguous superframes is transmitted continuously. According to the embodiments of FIG. 7 and FIG. 8, the user equipment can perform location measurement by accumulating the location measurement signals within the LBS zones transmitted continuously.

In this respect, the user equipment should know a superframe belonging to the LBS zone among a plurality of superframes received from each base station, so as to perform location measurement for LBS. Accordingly, the base station can transmit information indicating a superframe belonging to the LBS zone to the user equipment. For example, the base station can signal information indicating that the LBS zone has been enabled, to the user equipment through the MAC control message, or can signal to the user equipment that the LBS zone belongs to the superframe to which the SFH or the PA-preamble belongs, through the SFH or the PA-preamble. To this end, the processor 400*b* of the base station can generate the MAC control message, the SFH or the PA-preamble indicating that the LBS zone has been enabled. Also, the processor 400*b* of the base station can control the transmitter 100*b* of the base station to transmit the generated signal to the user equipment. The receiver 300*a* of the user equipment receives the MAC control message, the SFH or the PA-preamble and transfers it to the processor 400*a* of the user equipment. The processor 400*a* of the user equipment can identify the location of the LBS zone and/or whether the LBS zone has been enabled, based on the MAC control message, the SFH or the PA-preamble.

In the mean time, the information indicating whether the LBS zone has been enabled, which is transmitted through the MAC control message, the SFH or the PA-preamble, may be represented as information indicating whether an LBS location beacon symbol exists within the corresponding superframe. For example, 0b indicates that the LBS location beacon symbol does not exist within the corresponding superframe, and 1b indicates that the LBS location beacon symbol exists within the corresponding superframe. The base station sets the information on the LBS location beacon symbol to 1b when transmitting the LBS zone, and transmits the same to the user equipment through the MAC control message, the SFH or the PA-preamble to signal that the LBS zone is being transmitted.

However, if the LBS location beacon is transmitted periodically, the base station may not transmit the information indicating that the LBS zone has been enabled, separately. If the LBS zone can be transmitted at any one of various transmission periods, information indicating the transmission period may be transmitted to the user equipment through the MAC control message, the SFH or the PA-preamble. To this end, the processor 400b of the base station generates the MAC control message, the SFH or the PA-preamble to include information indicating the LBS transmission period, and controls the transmitter 100b of the base station to transmit the generated MAC control message, the generated SFH or the generated PA-preamble to the user equipment. The transmitter 100b of the base station transmits the MAC control message, the SFH or the PA-preamble to the user equipment at corresponding resources of the superframe under the control of the processor 400b of the base station. For example, the transmitter 100b of the base station can allocate the SFH to the first subframe within the superframe to transmit the same to the user equipment under the control of the processor 400b of the base station. Also, the transmitter 100b of the base station may transmit the PA-preamble to the user equipment through the first symbol of the second frame within the superframe. The receiver 300a of the user equipment receives the MAC control message, the SFH or the PA-preamble, which includes information indicating the transmission period of the LBS zone, and then transfers it to the processor 400a of the user equipment. Also, the receiver 300a of the user equipment can identify the LBS zone to which the LBS location beacon has been allocated, based on the transmission period of the LBS zone within the MAC control message, the SFH or the PA-preamble. In other words, if the information indicating the transmission period of the LBS zone is signaled to the user equipment, the user equipment can identify that the LBS zone is enabled per corresponding period. If the transmission period of the LBS zone is fixed to only one value, the information indicating the transmission period of the LBS zone may not be signaled to the user equipment.

In the mean time, both the information indicating whether the LBS zone has been enabled and the information indicating the transmission period of the LBS zone may be signaled to the user equipment through the MAC control message, the SFH or the PA-preamble. The information indicating whether the LBS zone has been enabled may be segmented into information indicating whether the LBS zone has been enabled and indicating the transmission period of the LBS zone and then signaled to the user equipment.

If the plurality of LBS zones are transmitted continuously, the number of LBS zones, which are transmitted continuously, can be signaled to the user equipment through the MAC control message, the SFH or the PA-preamble. However, if the number of LBS zones, which are transmitted continuously, is previously defined, the user equipment can identify corresponding superframes that can collect the LBS location beacon by identifying the information indicating that the LBS zone has been enabled and the transmission period of the LBS zone. In this case, the number of LBS zones may not be signaled to the user equipment.

The existing SA-preamble signal can be transmitted as the synchronization signal for location measurement for LBS, i.e., the LBS location beacon. Each base station allocates the corresponding SA-preamble signal to the LBS zone based on one of the aforementioned embodiments and transmits the signal to the user equipments of the corresponding coverage.

In the mean time, methods for allocating a location measurement signal for LBS, for example, LBS-preamble to the LBS zone can be divided into two types of methods. One of the two methods is that all or some of three SA-preamble symbols which are transmitted accumulatively within one superframe are replaced with synchronization signals for location measurement for LBS. Alternatively, symbols of all positions or some positions corresponding to the first symbol per frame excluding the second frame within one superframe may be replaced with the synchronization signals for location measurement for LBS. The other of the two methods is that a location measurement signal for LBS is additionally transmitted and the existing synchronization signals are transmitted as they are.

Hereinafter, embodiments related to the first method for transmitting LBS location measurement signals by replacing all or some of symbols used for transmission of the existing SA-preamble with synchronization signals for location measurement for LBS will be described with reference to FIG. 9 to FIG. 13. And, embodiments related to the second method for transmitting LBS location measurement signals separately from the existing synchronization signals will be described with reference to FIG. 14 to FIG. 19.

[First Method for Transmitting LBS Location Measurement Signals]

Since the SA-preamble is transmitted three times per superframe, overhead to system latency is high. Accordingly, all SA-preambles within one superframe may not be required for system synchronization. In this respect, in the first method for transmitting a LBS location measurement signal according to the present invention, at least one of existing SA-preamble symbols within the superframe to which the LBS zone belongs is replaced with the LBS location beacon. In the interval except for the LBS zone where at least one of the SA-preamble symbols is replaced with the LBS location beacon, instead of transmitting the existing SA-preamble to the location of the LBS symbol, on which the LBS location beacon can be transmitted, the LBS symbol may be muted, or other signal (for example, general data/control signal) not the existing SA-preamble signal may be transmitted. Instead of replacing the existing SA-preamble symbol with the LBS location beacon, if the LBS location beacon is allocated to the other symbol to which control channel/data are transmitted, a resource allocation method of the control channel or data allocated to the other symbol is different from a resource allocation method of the LBS location beacon corresponding to the synchronization signal, whereby complexity in system configuration may be increased. For example, if the control channel/data and the LBS location beacon are allocated to the same frequency band, the existing permutation method cannot be used due to the difference between the resource allocation method of the control channel/data and the resource allocation method of the LBS location beacon. By contrast, according to the first method for transmitting LBS location measurement signals, it is advantageous in that the existing permutation method used for subcarrier mapping of the existing SA-preamble can be used for subcarrier mapping to the LBS location beacon. In this case, it is advantageous in that a new permutation method for the LBS location beacon is not required and the LBS location beacon can be transmitted without increase of complexity in system configuration. Also, since the LBS location beacon is only transmitted without any other signal for a specific time, i.e., specific symbol, a power adjusting problem occurring when signals of different characteristics are transmitted does not occur.

Figure 9:
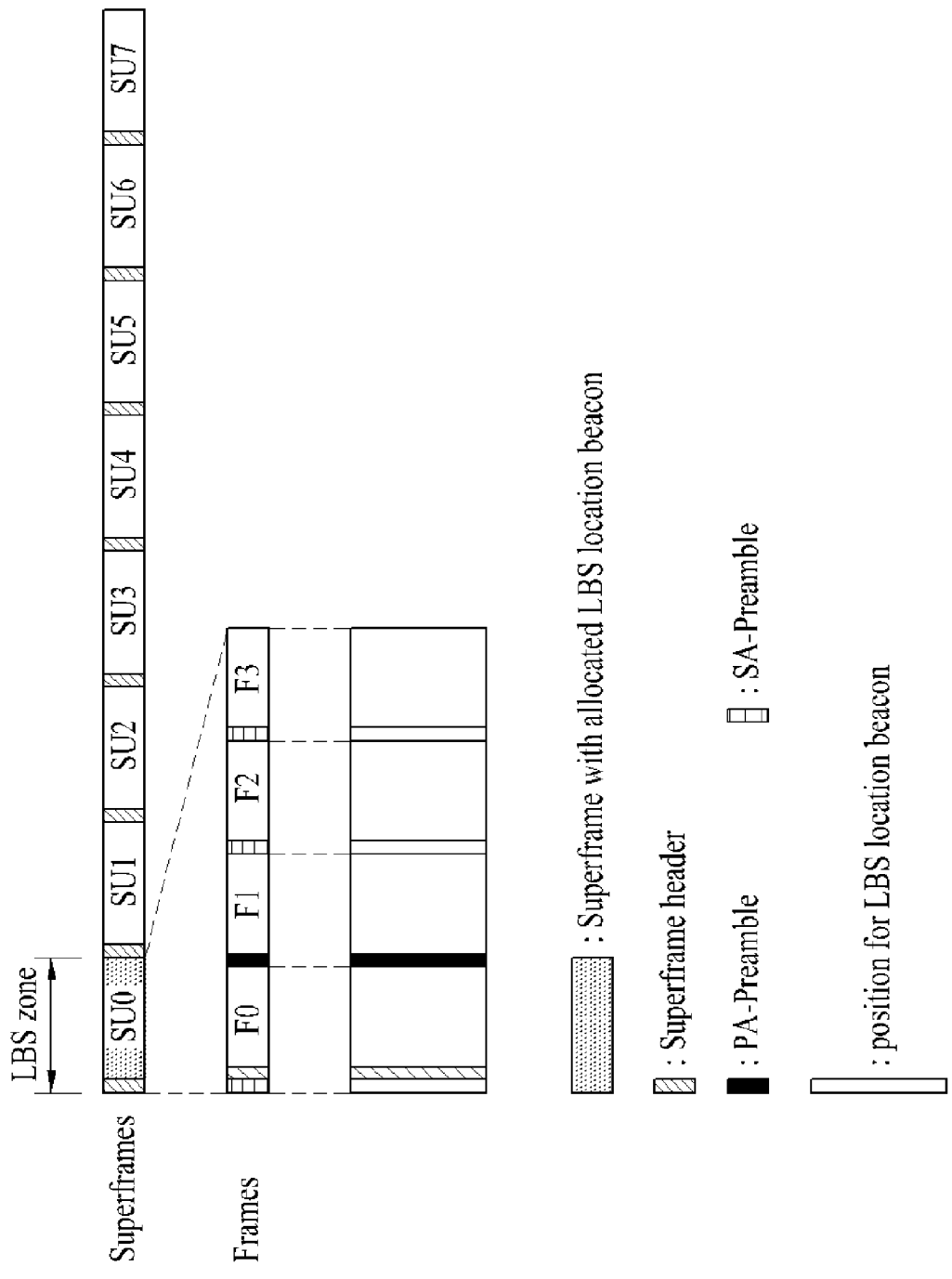
FIG. 9 to FIG. 13 are diagrams illustrating embodiments related to a first method for transmitting LBS location measurement signals by replacing all or some of symbols used for transmission of SA-preamble with synchronization signals for location measurement.
Figure 10:
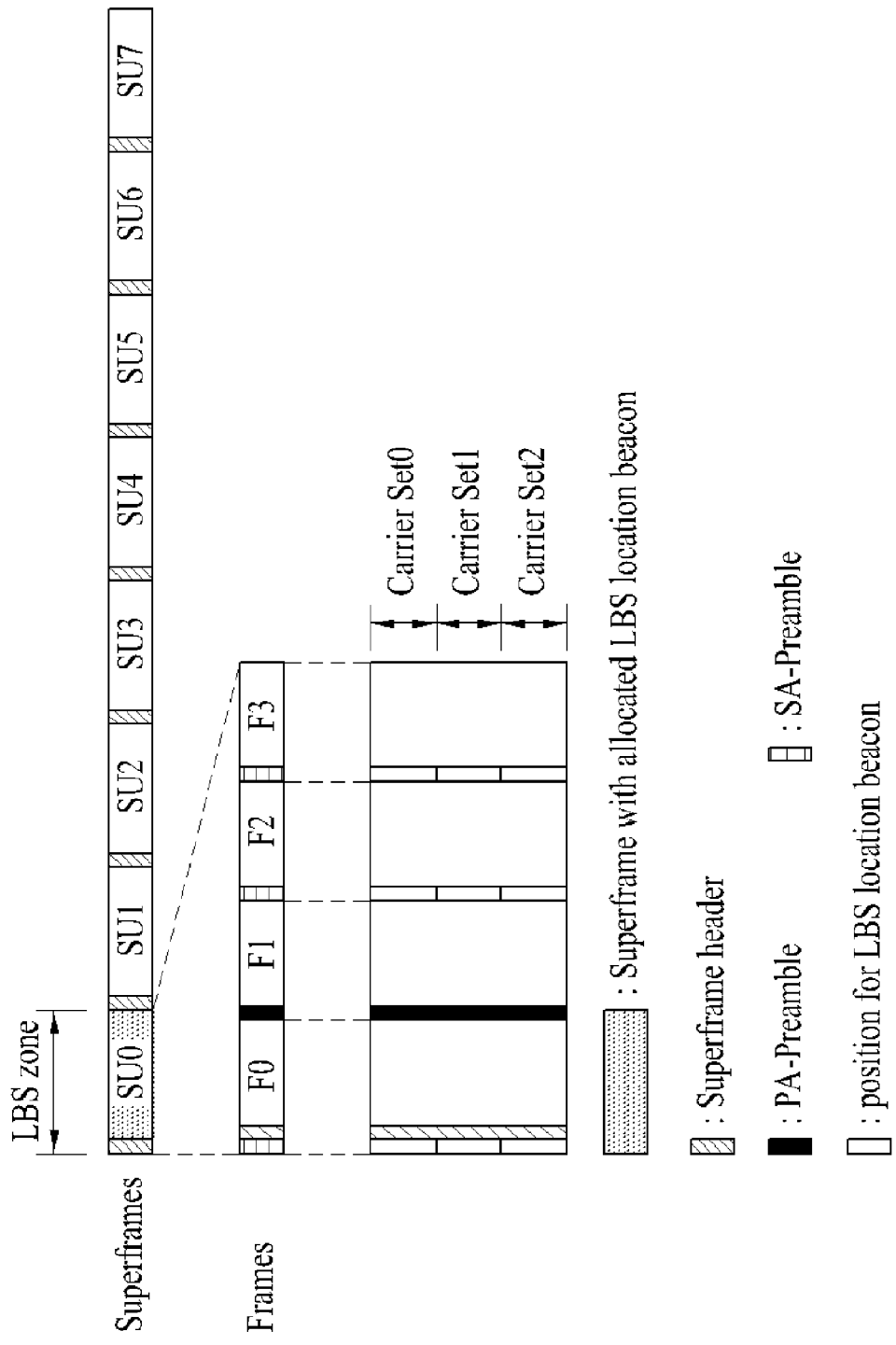
Figure 11:
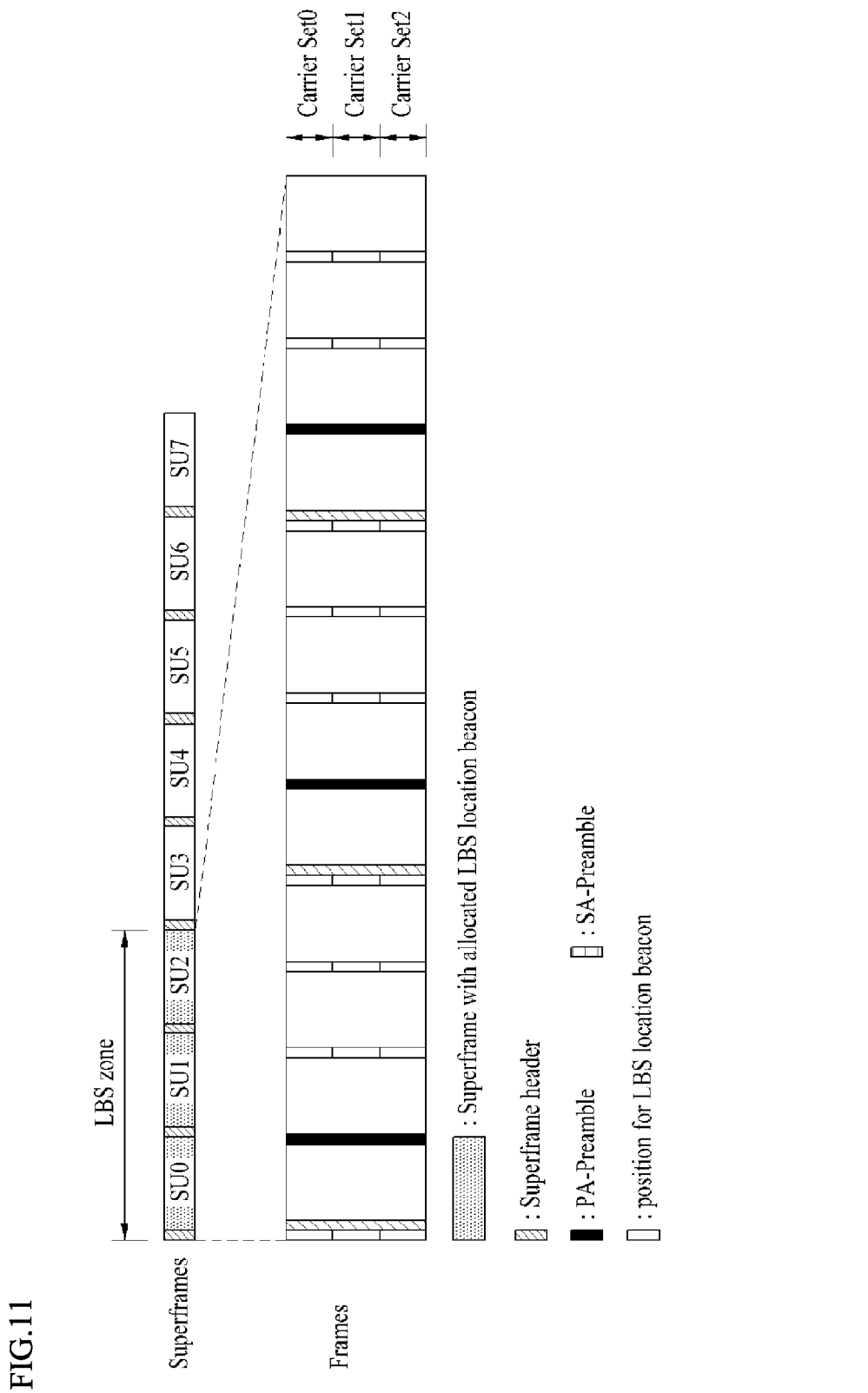
Figure 12:
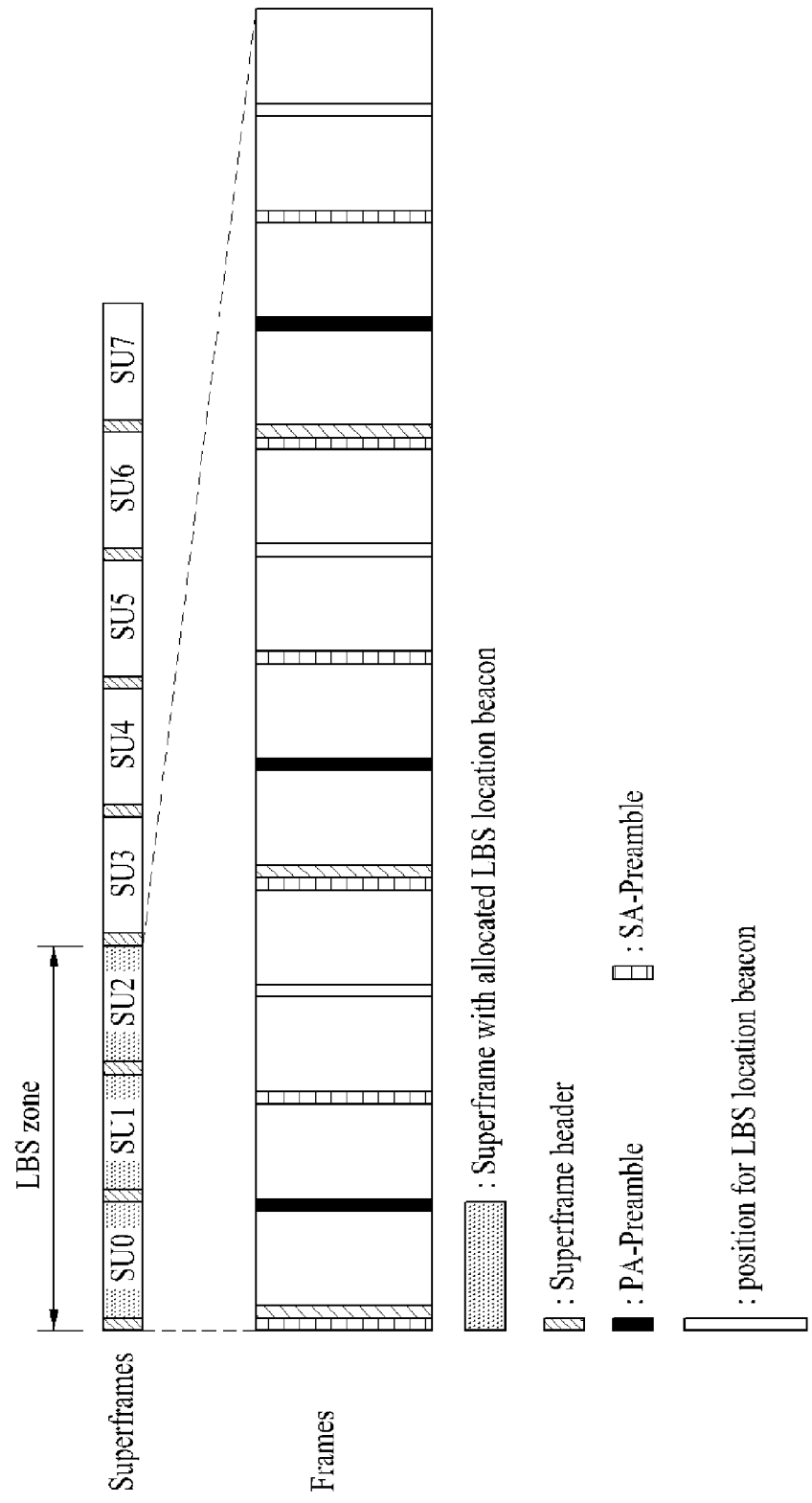
Figure 13:
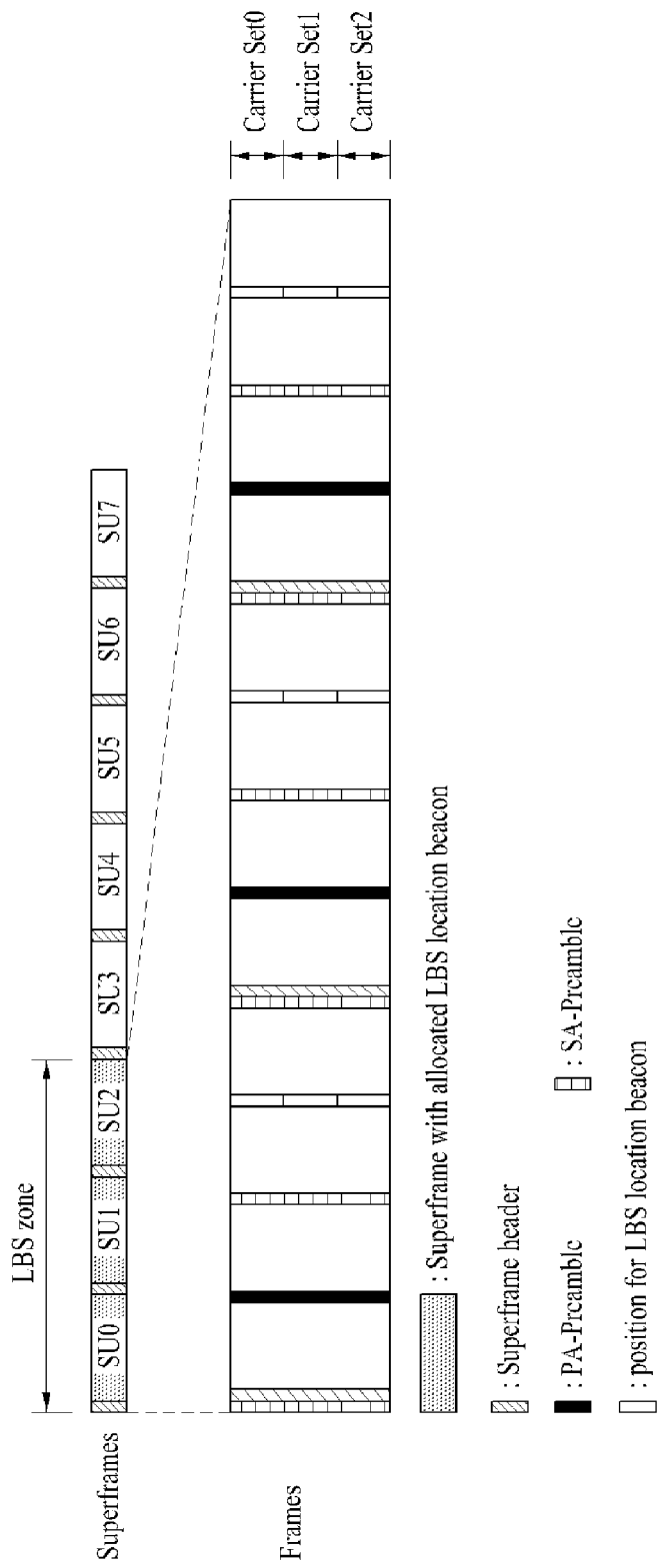

FIG. 9 to FIG. 11 are diagrams illustrating embodiments related to the case where the SA-preamble symbol, which can be replaced with the LBS location beacon, among the symbols on which the SA-preamble within the superframe could have been transmitted, is not fixed. FIG. 12 and FIG. 13 are diagrams illustrating embodiments related to the case where the SA-preamble symbol, which can be replaced with the LBS location beacon, among the symbols on which the SA-preamble within the LBS superframe could have been transmitted, is fixed.

In FIG. 9, one superframe is included in the LBS zone, and three existing symbols on which the SA-preamble has been transmitted are used for allocation of the LBS location beacon. In other words, all of three existing SA-preamble symbols may be used for transmission of the LBS location beacon.

Referring to FIG. 9, the base station can transmit the LBS location beacon to the user equipment by allocating it to at least one of the first symbol of the first frame F0, the first symbol of the third frame F1 and the first symbol of the fourth frame F3, to which the existing SA-preamble is allocated.

According to the embodiment of FIG. 9, the LBS location beacon can be allocated to three positions existing in one LBS zone. Hereinafter, the number of positions in one LBS zone, to which the LBS location beacon can be allocated, i.e., the number of positions having a possibility of allocation of the LBS location beacon will be referred to as the number of reuse patterns. One reuse pattern is defined by orthogonal resources of symbol and carrier sets. One carrier set corresponds to one frequency segment. Accordingly, in the present invention, the terminology, "carrier set" may be used to mean "segment", and vice versa. In the embodiment of FIG. 9, since the number of positions in one LBS zone, to which the LBS location beacon can be allocated, is three, one LBS zone supports three reuse patterns.

In FIG. 10, one superframe is included in one LBS zone, and three existing SA-preamble symbols within the LBS zone are used for allocation of the LBS location beacon. In this case, each SA-preamble symbol is divided into three segments in the frequency domain, whereby the number of reuse patterns for the LBS location beacon is increased.

Referring to FIG. 10, the base station can transmit the LBS location beacon to the user equipment by allocating it to at least one of a total of nine reuse patterns that include three symbols, to which the existing SA-preamble is allocated, and three segments per symbol.

In FIG. 11, a plurality of contiguous superframes are included in one LBS zone, and three SA-preamble symbols within each superframe of the LBS zone are used for allocation of the LBS location beacon. In this case, each SA-preamble symbol is divided into three segments in the frequency domain, whereby the number of reuse patterns for the LBS location beacon is increased.

Referring to FIG. 11, the base station can transmit the LBS location beacon to the user equipment by allocating it to at least one of a total of twenty-seven (27) reuse patterns that include three SA-preamble symbols and three segments per SA-preamble symbol in three superframes constituting the LBS zone.

The base station can signal information indicating what SA-preamble symbol within the superframe or what frame to which the SA-preamble symbol belongs is used for transmission of the LBS location beacon, to the user equipment. For example, referring to FIG. 9 and FIG. 10, 00b indicates the first SA-preamble or the first frame within the LBS superframe, 01b indicates the second SA-preamble or the third frame within the LBS superframe, and 10b indicates the third SA-preamble or the fourth frame within the LBS superframe. In this way, the LBS symbols can be designated.

The embodiments of FIG. 9 to FIG. 11 are advantageous in that superframes smaller than those of FIG. 12 and FIG. 13 can support more reuse patterns for the LBS location beacon transmission.

In FIG. 12, a plurality of contiguous superframes are included in one LBS zone, and one or two of three SA-preamble symbols within each superframe of the LBS zone are replaced with the LBS location beacon.

In the embodiments of FIG. 9 to FIG. 11, all of the symbols to which three existing SA-preambles are allocated can be used for allocation of the LBS location beacon. However, in the embodiment of FIG. 12, any one or some of symbols to which three existing SA-preambles are allocated may not be replaced with the LBS location beacon. For example, referring to FIG. 12, the last one of the SA-preamble symbols within one superframe may be predefined for allocation of the LBS location beacon. In this case, the base station transmits the synchronization signals at the superframe to which the LBS zone belongs, in the order of SA-preamble, PA-preamble, SA-preamble, and LBS location beacon.

Since one symbol in each of three superframes is used for allocation of the LBS location beacon, the LBS zone of FIG. 12 can support a total of three reuse patterns. The base station can transmit the LBS location beacon to the user equipment by allocating it to at least one of the three reuse patterns.

In FIG. 13, a plurality of contiguous superframes are included in one LBS zone, and one or two of three SA-preamble symbols within each superframe of the LBS zone are replaced with the LBS location beacon. In the same manner as FIG. 12, the SA-preamble symbol that can be replaced with the LBS location beacon is pre-designated within one superframe. For example, referring to FIG. 13, the last SA-preamble symbol within one superframe may be predefined to be replaced with the LBS location beacon. In this case, the base station transmits the synchronization signals at the superframe to which the LBS zone belongs, in the order of SA-preamble, PA-preamble, SA-preamble, and LBS location beacon.

One symbol in each of three superframes is used for allocation of the LBS location beacon. Also, the symbol is divided into three carrier sets, whereby each carrier set can be used for allocation of the LBS location beacon. Accordingly, the LBS zone of FIG. 13 can support a total of nine reuse patterns. The base station can transmit the LBS location beacon to the user equipment by allocating it to at least one of the nine reuse patterns.

According to the embodiments of FIG. 12 and FIG. 13, the symbol to which the LBS location beacon can be allocated is predefined. Accordingly, it is advantageous in that information indicating the position of the SA-preamble and symbol replaced with the LBS location beacon may not be provided to the user equipment separately. Also, the base station according to the embodiments of the present invention can transmit the corresponding LBS zone in a state that it mutes the other reuse patterns except for the reuse pattern carrying the actual LBS location beacon. In this case, if all SA-preamble symbols within the LBS zone can be replaced with the LBS location beacon, any SA-preamble may not be transmitted within the LBS zone. Accordingly, if some SA-preamble symbol(s) predefined within the LBS zone are only replaced with the LBS location beacon, the existing SA-preamble can be transmitted at the other SA-preamble symbols except for the some SA-preamble symbol(s). Also, at the LBS zone where the LBS location beacon of a specific base station is transmitted actually, if neighboring base stations should mute the SA-preamble, the SA-preamble symbol to be muted is previously defined. In this case, it is advantageous in that the neighboring base stations can easily mute the corresponding SA-preamble symbol only at the LBS superframe without identifying the location of the LBS reuse patterns.

In the aforementioned embodiments of FIG. 9 to FIG. 13, the number R of reuse patterns for the LBS location beacon, which are supported by one LBS zone, can be expressed as follows.

$$R = N_{LBS\ superframe\ in\ LBS\ zone} \times N_{LBS\ symbol\ in\ LBS\ superframe} \times N_{carrier\ set\ in\ LBS\ symbol}$$ [Math FIG. 1]

$N_{LBS\ superframe\ in\ LBS\ zone}$ represents the number of superframes constituting one LBS zone, $N_{LBS\ symbol\ in\ LBS\ superframe}$ represents the number of symbols to which the LBS location beacon can be allocated per superframe to which the LBS zone belongs, and $N_{carrier\ set\ in\ LBS}$ symbol represents the number of segments of a symbol, to which the LBS location beacon can be allocated, at the LBS zone. For example, since the LBS zone spans a total of three superframes in FIG. 13, $N_{LBS\ superframe\ in\ LBS\ zone}$ is 3. Since the LBS location beacon is allocated to the last SA-preamble symbol per LBS superframe, $N_{LBS\ symbol\ in\ LBS\ superframe}$ is 1. Since the last SA-preamble symbol is divided into three segments and the LBS location beacon can be allocated to any one of the three segments, $N_{carrier\ set\ in\ LBS\ symbol}$ is 3. In this way, one LBS zone supports a total of nine reuse patterns.

The present invention includes an embodiment that the position for the LBS location beacon transmitted from each base station is set regardless of a cell and an embodiment that the position for the LBS location beacon transmitted from each base station is set uniquely in association with a cell. The base station can signal information indicating the SA-preamble and/or frequency segment replaced with the LBS location beacon by the corresponding base station, to the user equipment. The information can be transmitted to the user equipment through the MAC control message, the SFH or the PA-preamble. If the position for the LBS location beacon is defined uniquely in association with a cell, the user equipment may identify the position for the LBS location beacon by acquiring cell ID from the existing SA-preamble. In the case that the position for the LBS location beacon is associated with cell ID, i.e., in the case that the position for the LBS location beacon is defined cell-specifically, embodiments related to the method for allocating the LBS location beacon will be described later with reference to Table 1 to Table 10.

[Second Method for Transmitting LBS Location Measurement Signals]

If the existing SA-preamble is replaced with the LBS location beacon, performance of the existing SA-preamble is deteriorated. In order to minimize an effect on the existing system, in the second method for transmitting LBS location measurement signals according to the present invention, the existing SA-preamble is transmitted at the existing symbol position and the existing carrier set, and additional preamble for supporting LBS is transmitted. To this end, instead of replacing the existing SA-preamble within the superframe to which the LBS zone belongs, with the LBS location beacon, the LBS location beacon is allocated to at least one of the other symbols except for the symbols to which the SFH, the PA-preamble and the SA-preamble are allocated. In other words, in the second method for transmitting LBS location measurement signals according to the present invention, the existing SA-preamble is transmitted at the existing position and the existing transmission time, and additional synchronization signal for location measurement is transmitted to support LBS. According to the second method for transmitting LBS location measurement signals, since the SA-preambles of the existing system are all transmitted as they are, it is advantageous in that performance of the existing SA-preamble is not deteriorated.

The position to which the LBS location beacon is transmitted can be acquired in such a manner that the existing preamble, i.e., PA-preamble and/or SA-preamble is shifted at a constant interval. The shifted level may be an OFDMA symbol unit, subframe unit, or frame unit. The shifted level from the existing preamble location may be a previously defined value. Also, the shifted level may be signaled to the user equipment through the MAC control message, the SFH, or the PA-preamble. Hereinafter, the case where the symbol at the position where the existing SA-preamble symbol is shifted at a constant interval is used for transmission of the LBS location beacon will be described exemplarily. Likewise, the second method according to the present invention may also be applied to the case where the symbol at the position where the existing PA-preamble symbol is shifted at a constant interval is used for transmission of the LBS location beacon.

The embodiments related to the second method will be described in more detail with reference to FIG. 14 to FIG. 18.

Figure 14:
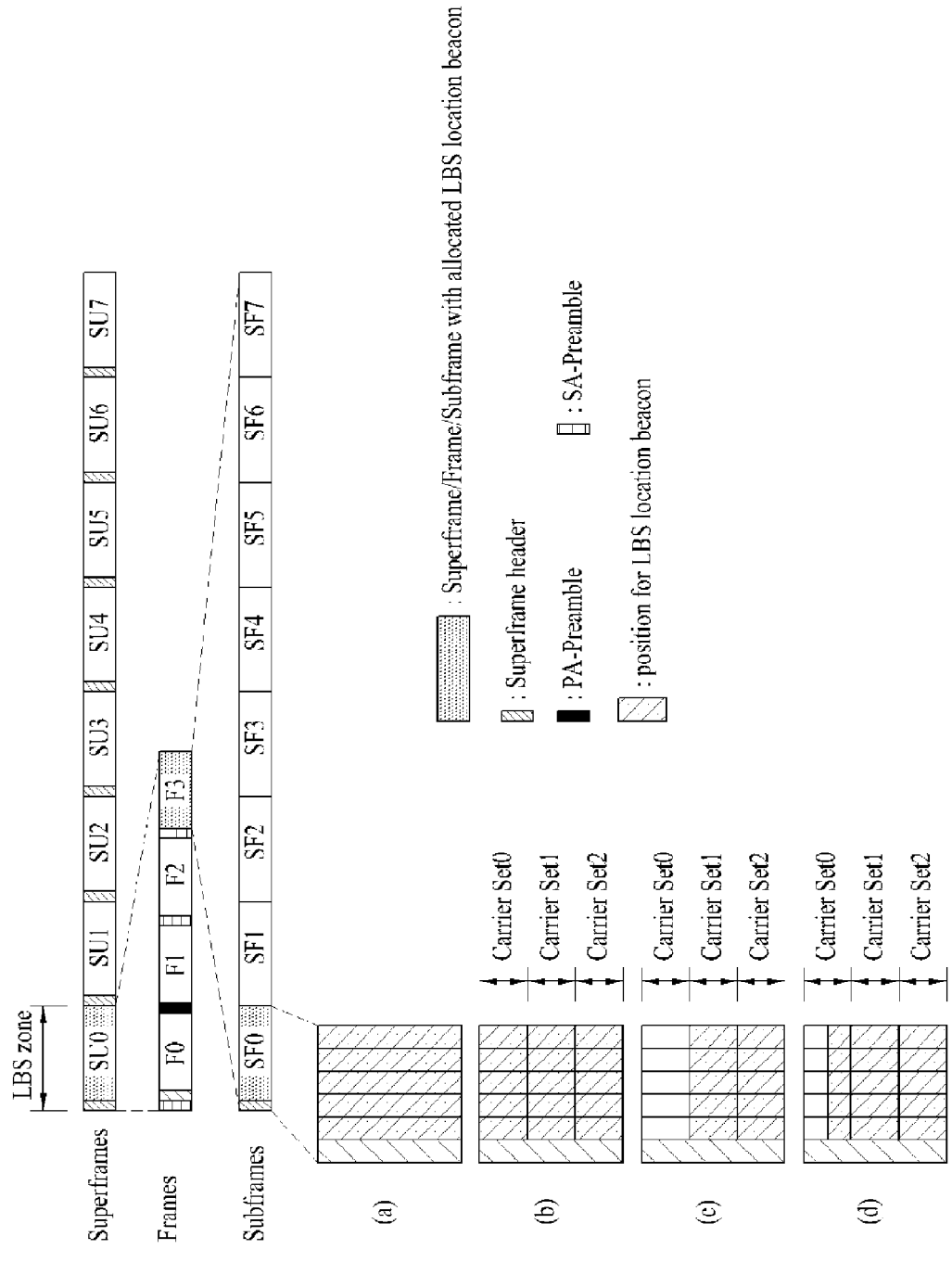
FIG. 14 to FIG. 19 are diagrams illustrating embodiments related to a second method for transmitting LBS location measurement signals separately from existing synchronization signals.

In FIG. 14, one superframe is included in one LBS zone, and symbols within one of frames to which the existing SA-preamble is allocated are used for transmission of the LBS location beacon.

The other OFDMA symbols except for the symbol to which the existing preamble is allocated, i.e., the first symbol of the frame can be used for allocation of the LBS location beacon. For example, referring to FIG. 14, the first symbol of the last frame of the LBS superframe is used for transmission of the existing SA-preamble, and the other symbols of the first subframe SF0 of the last frame are used for transmission of the LBS location beacon.

In (a) of FIG. 14, five symbols of the first subframe SF0 can be used for transmission of the LBS location beacon. In this case, one LBS zone supports five reuse patterns.

In (b) of FIG. 14, each of five symbols of the first subframe SF0 is divided into three segments and then each of the three segments can be used for transmission of the LBS location beacon. In this case, one LBS zone supports 5*3 reuse patterns, i.e., fifteen reuse patterns.

In (c) of FIG. 14, some of three frequency segments of the symbol are used for transmission of the LBS location beacon. Referring to (c) FIG. 14, as two segments are only used for transmission of the LBS location beacon, one LBS zone supports 5*2 reuse patterns, i.e., ten reuse patterns. CarrierSet0 corresponding to segment 1 which is not used for transmission of the LBS location beacon is a segment to which a control channel is allocated.

In (d) of FIG. 14, other frequency bands except for some of frequency bands of five symbols are used for transmission of the LBS location beacon. Referring to (d) FIG. 14, for example, some of CarrierSet1 are used for transmission of a control channel, for example, A-MAP (Advanced MAP), and the others are used for transmission of the LBS location beacon. The other bands of CarrierSet1 except for the band on which the control channel is transmitted are subject to another frequency band, for example, CarrierSet2 or CarrierSet3, and can be used for transmission of the LBS location beacon. For example, if the LBS location beacon is allocated to Carrier-Set2 of the second symbol of the first subframe SF0, the LBS location beacon may be allocated to the frequency band of CarrierSet1 to which the control channel is not transmitted. In this case, the LBS zone of (d) of FIG. 14 can support 5*2 reuse patterns, i.e., ten reuse patterns. For another example, the other frequency band to which the control channel of CarrierSet1 is not transmitted may be used for transmission of the LBS location beacon as a frequency segment independent from CarrierSet2 and CarrierSet3. In other words, the other frequency band of CarrierSet1 may be used as one reuse pattern. In this case, the LBS zone of (d) of FIG. 14 can support 5*3 reuse patterns, i.e., fifteen reuse patterns.

Figure 15:
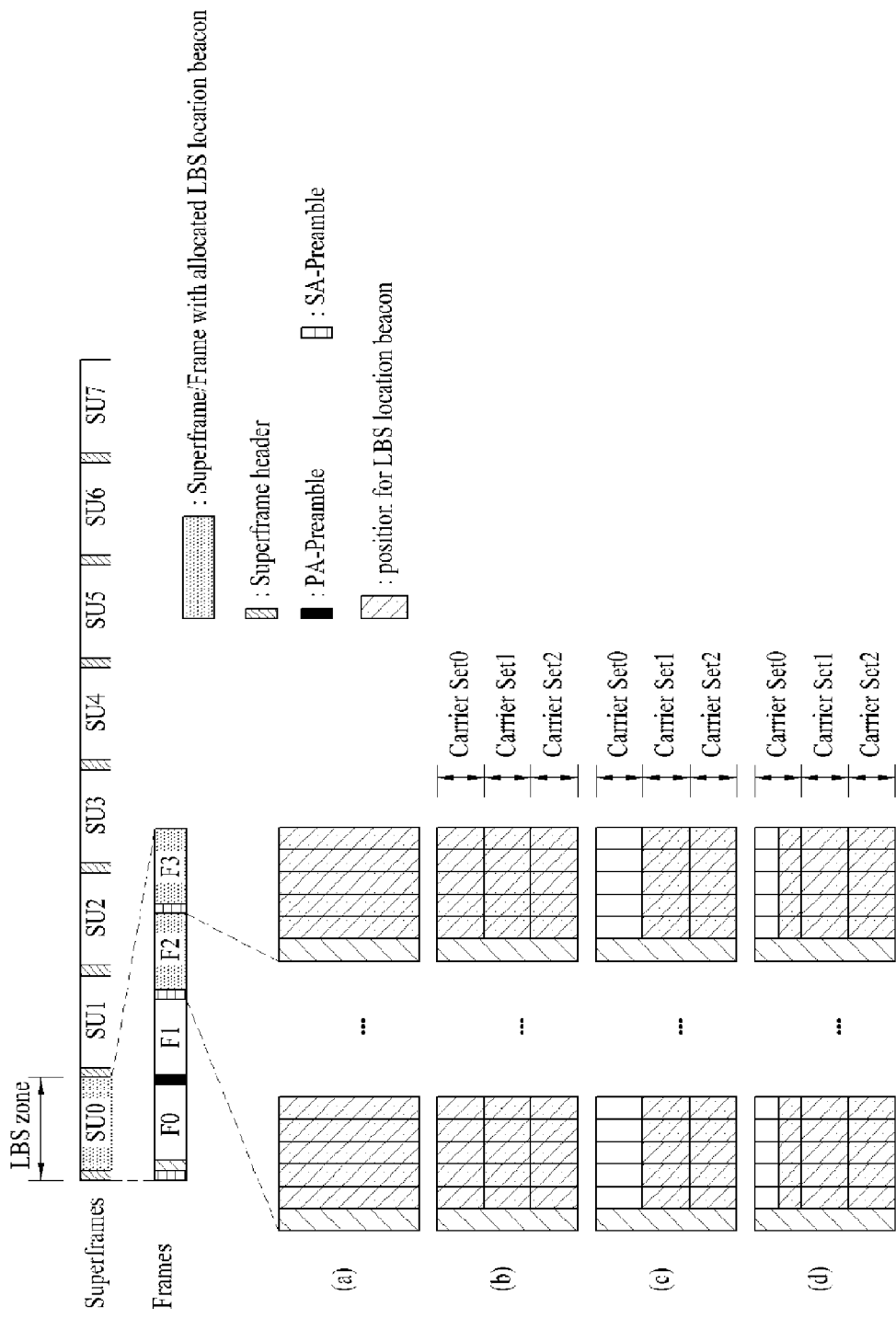

In FIG. 15, one superframe is included in one LBS zone, and symbols within two or more of frames to which the existing SA-preamble is allocated are used for transmission of the LBS location beacon.

The embodiment of FIG. 15 is different from that of FIG. 14 in that symbols within a plurality of frames are used for transmission of the LBS location beacon. In the embodiment of FIG. 15, since the number of symbols used for allocation of the LBS location beacon is increased in proportion to the number of frames, the number of reuse patterns supported by the same number of superframes is increased. For example, since the second to sixth symbols of each of F2 and F3 are used for transmission of the LBS location beacon in FIG. 15, the LBS zone of FIG. 15 supports reuse patterns twice more than those of the LBS zone of FIG. 14.

Figure 16:
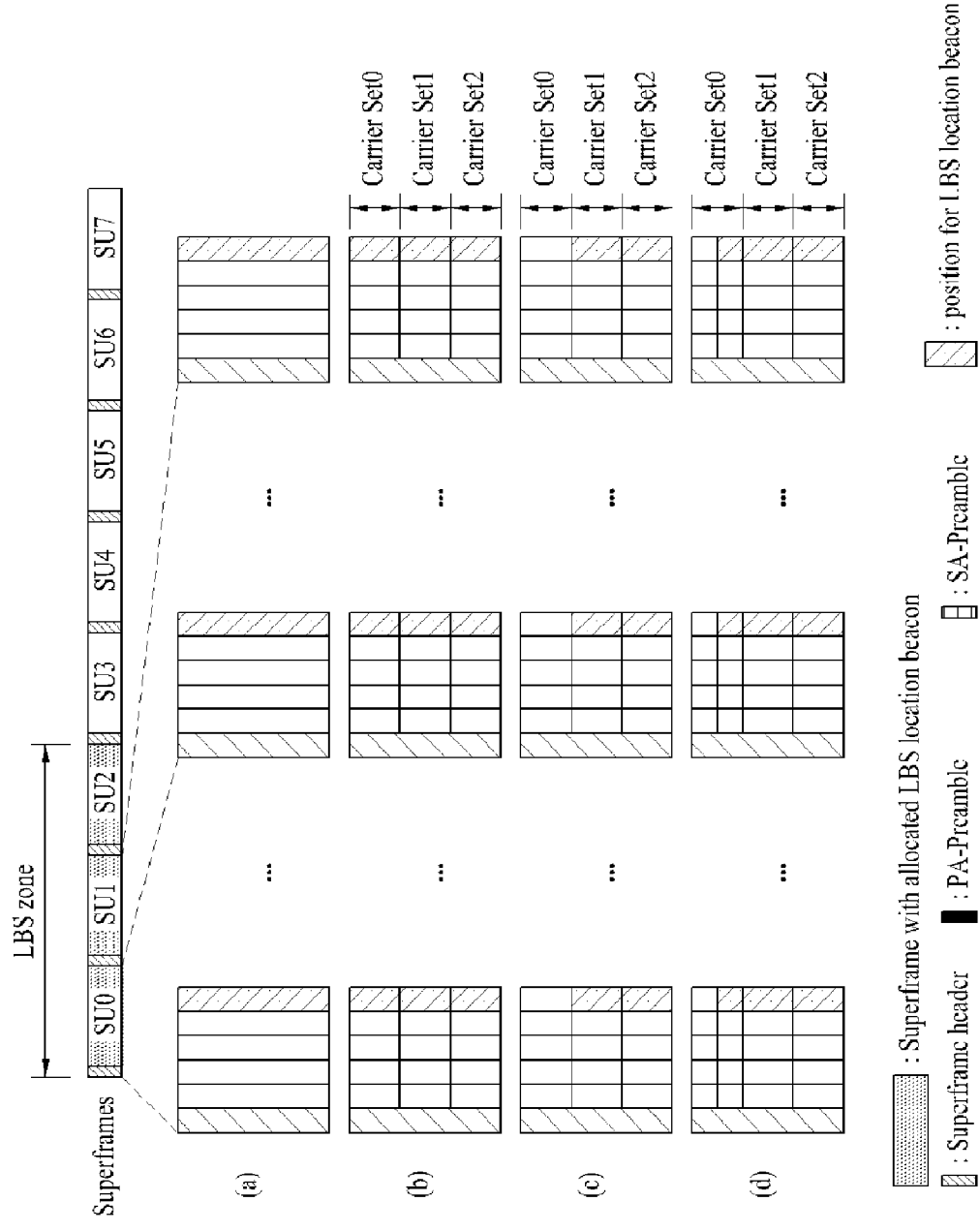

In FIG. 16, a plurality of contiguous superframes are included in one LBS zone, and at least one symbol per superframe is used for transmission of the LBS location beacon.

Referring to FIG. 16, one LBS zone is transmitted through three contiguous superframes SU0, SU1, and SU2. In each of SU0, SU1, and SU2, one of symbols except for the symbols on which the existing SFH, PA-preamble and SA-preamble are transmitted, is used for transmission of the LBS location beacon. In other words, only some of five symbols are used for transmission of the LBS location beacon.

Accordingly, referring to FIG. 6, the number of symbols to which the LBS location beacon can be allocated at one LBS zone becomes 3. In the mean time, the number of reuse patterns for transmission of the LBS location beacon is increased depending on how many frequency segment exists in each of LBS symbols to which the LBS location beacon can be allocated. For example, in (a) of FIG. 16, since the LBS location beacon is allocated to one of three symbols, the number of reuse patterns is 3. In (b) of FIG. 16, since the LBS location beacon is allocated to any one of three frequency segments in each of three LBS symbols, the number of reuse patterns is 9. In (c) of FIG. 16, since two frequency segments per LBS symbol are used for transmission of the LBS location beacon, the number of reuse patterns is 6.

The base station can signal information indicating a symbol for the LBS location beacon among the other OFDMA symbols except for the SA-preamble symbol of the superframe on which the SA-preamble is transmitted, i.e., LBS symbol, to the user equipment. The information may be signaled to the user equipment in the form of a bitmap. Alternatively, if a start symbol for the LBS location beacon is predefined, information indicating the number of symbols available for LBS location beacon transmission may be signaled to the user equipment in 3 bits. If the LBS symbols are indicated by the form of a bitmap, for example, 00100b can indicate that the third OFMDA symbol of five OFDMA symbols is used as the LBS symbol. For another example, if the start position of the LBS symbol is fixed at the second one of six symbols constituting the LBS subframe, the base station can transmit 001b, and the user equipment identifies from 001b that only one symbol is used as the LBS symbol, whereby the user equipment can recognize that the second symbol is the LBS symbol. Alternatively, the base station transmits 010b, and the user equipment identifies from 010b that two symbols are used as the LBS symbols, whereby the user equipment can recognize that the second and third symbols are the LBS symbols.

For convenience of description, an example which uses only one symbol per superframe to which the LBS zone belongs for transmission of the LBS location beacon in FIG. 16 is described, but more symbols may be used. In this case, the number of reuse patterns supported by one LBS zone is increased in proportion to the number of symbols to which the LBS location beacon can be allocated per superframe.

In the aforementioned embodiments of FIG. 14 to FIG. 16, the number R of reuse patterns supported by one LBS zone can be expressed as follows.

$$R = N_{LBS\ superframe\ in\ LBS\ zone} \times N_{LBS\ symbol\ in\ LBS\ superframe} \times N_{carrier\ set\ in\ LBS\ symbol} \quad \text{[Math FIG. 2]}$$

$N_{LBS\ superframe\ in\ LBS\ zone}$ represents the number of superframes constituting the LBS zone, $N_{LBS\ symbol\ in\ LBS\ superframe}$ represents the number of symbols to which the LBS location beacon can be allocated per superframe to which the LBS zone belongs, and $N_{carrier\ set\ in\ LBS}$ symbol represents the number of frequency segments in the LBS symbol to which the LBS location beacon can be allocated. For example, since the LBS zone spans a total of three superframes in (b) FIG. 16, $N_{LBS\ superframe\ in\ LBS\ zone}$ is 3. Since the LBS location beacon can be allocated one symbol per LBS superframe, $N_{LBS\ symbol\ in\ LBS\ superframe}$ is 1. Since three frequency segments per LBS symbol can be used for transmission of the LBS location beacon, $N_{carrier\ set\ in\ LBS\ symbol}$ is 3. In this way, one LBS zone supports a total of nine reuse patterns.

In the embodiments of (c) of FIG. 14, (c) of FIG. 15 and (c) of FIG. 16, instead of all frequency bands of the LBS symbol, some frequency segments are only used for transmission of the LBS location beacon, and the other frequency segments are used for general transmission of control channel and/or data. In particular, if all frequency segments are used for transmission of the LBS location beacon, a problem may occur in respect of the control channel. For example, although the A-MAP should be transmitted per subframe, if all frequency segments of the LBS symbol are reserved for transmission of the LBS location beacon, the A-MAP may not be transmitted. Failure in transmission of the A-MAP could lead to failure in HARQ transmission, whereby throughput of the communication system may be deteriorated. Accordingly, in the embodiments of (c) of FIG. 14, (c) of FIG. 15 and (c) of FIG. 16, some of a plurality of frequency segments constituting the LBS symbol are only used for transmission of the LBS location beacon. The LBS location beacon is not allocated to the other frequency segments for transmission of the control channel such as A-MAP. The base station can signal the frequency segments used for transmission of the LBS location beacon to the user equipment through the MAC control message, the SFH or the PA-preamble. For example, if the LBS symbol is divided into three frequency segments, the base station can indicate one of three frequency segments, on which the LBS location beacon can be transmitted, by using a bitmap of 3 bits. For example, if the bitmap set to 010b can indicate that the second segment is used for allocation of the LBS location beacon. For another example, a start segment of the three frequency segments is fixed, and information of the number of segments used can be signaled using 2 bits. For example, referring to (c) of FIG. 14, if the segments from the second one can be used for transmission of the LBS location beacon, the base station transmits a bit stream of 10b to indicate that two segments from the second one are used for transmission of the LBS location beacon.

In the mean time, even though the base station does not signal the frequency segment used for transmission of the LBS location beacon explicitly, the user equipment may implicitly the segment used for transmission of the LBS location beacon through information of the A-MAP zone indicated by the SFH. For example, referring to (c) of FIG. 14, (c) of FIG. 15 and (c) of FIG. 16, the SFH can include information indicating that the A-MAP is allocated to CarrierSet0. Also, the user equipment can identify that CarrierSet1 and CarrierSet2 except for CarrierSet0 are used for transmission of the LBS location beacon.

In the same manner as the embodiments of (c) of FIG. 14, (c) of FIG. 15 and (c) of FIG. 16, in the embodiments of (d) of FIG. 14, (d) of FIG. 15 and (d) of FIG. 16, instead of all frequency bands of the LBS symbol, some frequency bands in a frequency segment are only used for transmission of the control channel. In this case, the LBS location beacon can be allocated to the other frequency bands in the frequency segment, excluding the frequency band to which the control channel is allocated. For example, referring to (d) of FIG. 14, (d) of FIG. 15 and (d) of FIG. 16, the LBS location beacon is not allocated to some of CarrierSet0 for transmission of the control channel but can be allocated to the other part of CarrierSet0. For example, it is supposed that HARQ ACK/NACK related A-MAP is transmitted. In this case, the size of the A-MAP can be identified through HARQ A-MAP size information indicated by the SFH, i.e., the number of ACK/NACK channels used per bandwidth.

Figure 17:
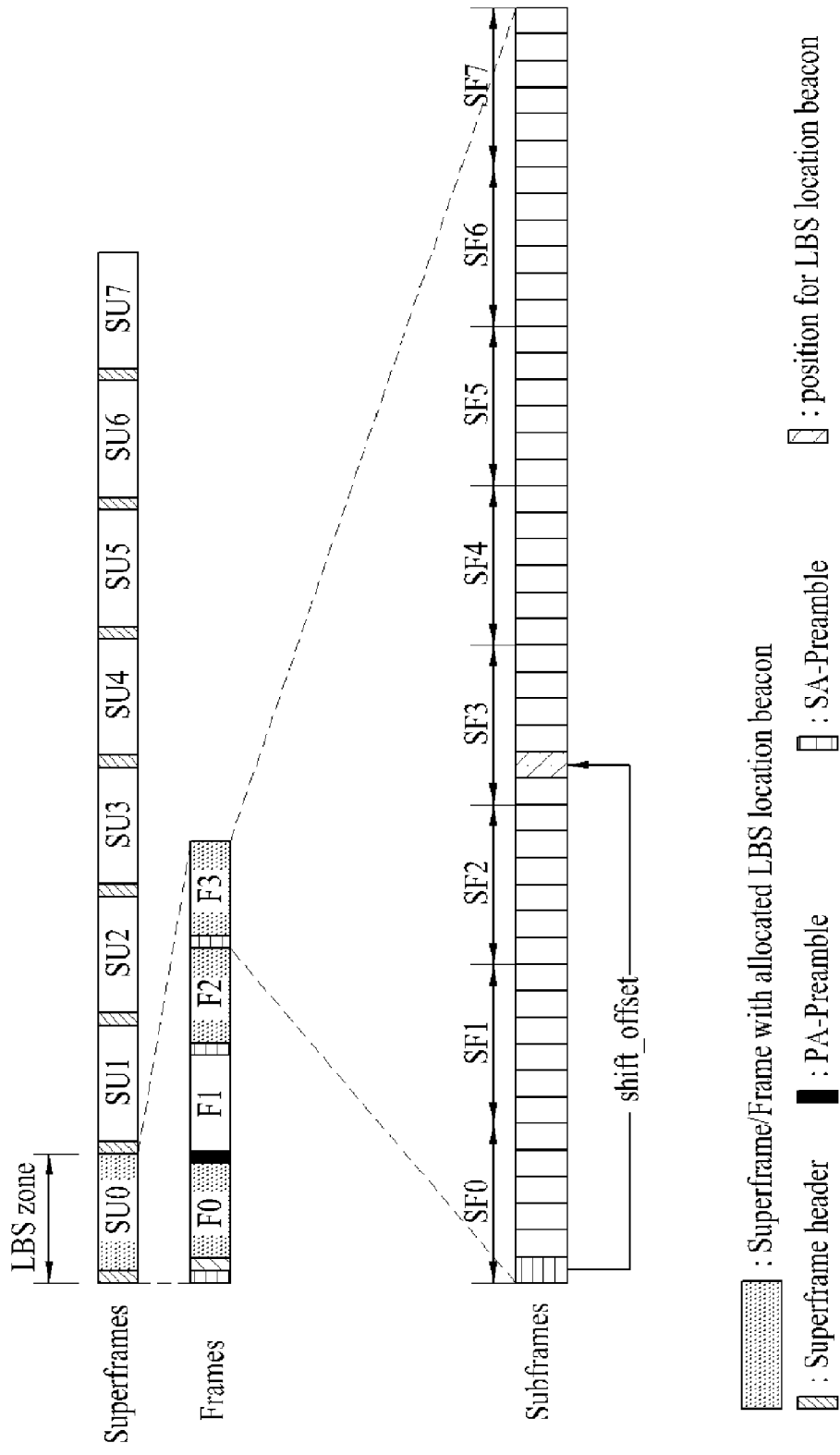
Figure 18:
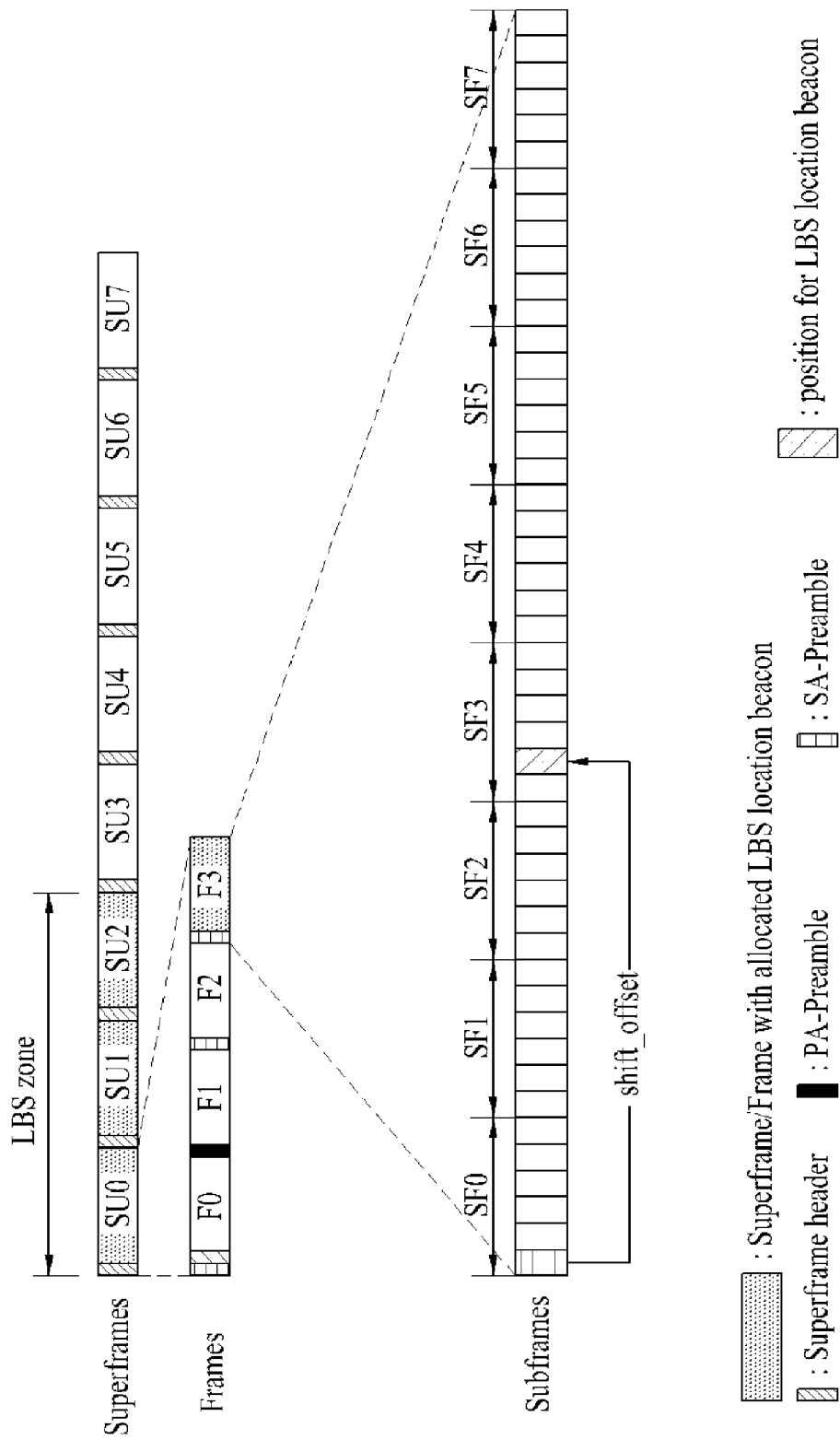
Figure 19:
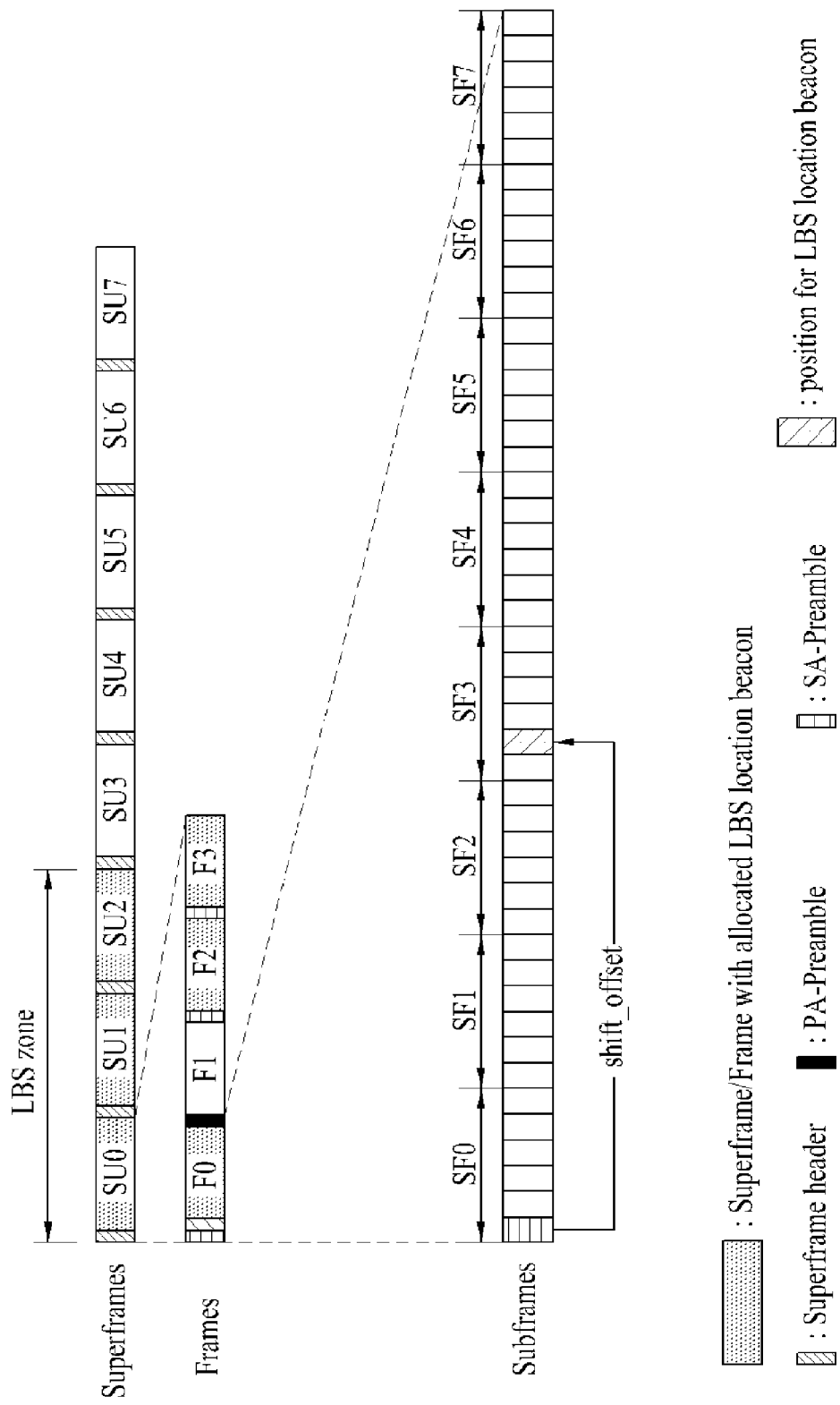

In the aforementioned embodiments of FIG. 9 to FIG. 16, the positions of the symbols to which the LBS location beacon can be transmitted are limited. In other words, the LBS location beacon is allocated to at least one of reuse patterns within the LBS zone, and the positions of the carrier sets and symbols constituting the reuse patterns are not varied within the superframe. However, it is possible vary the positions of the reuse patterns according to a cell. FIG. 17 to FIG. 19 are diagrams illustrating embodiments that positions of reuse patterns, on which the LBS location beacon can be transmitted, is varied in the LBS zone depending on a cell. In FIG. 17 to FIG. 19, shift_offset is a value varied depending on a cell.

In FIG. 17, one superframe is included in one LBS zone, and symbols shifted from the existing SA-preambles at a predetermined interval are used for transmission of the LBS location beacon. Referring to FIG. 17, three symbols shifted from three existing SA-preamble symbols at a predetermined interval can be used for transmission of the LBS location beacon. If each of the LBS symbols is divided into three carrier sets, respectively, the corresponding LBS zone will support a total of nine reuse patterns for the LBS location beacon.

In FIG. 18, a plurality of superframes are included in one LBS zone, and symbols shifted from one SA-preamble of each superframe at a predetermined interval are used for transmission of the LBS location beacon. Referring to FIG. 18, one of three SA-preamble symbols within each superframe, for example, symbol shifted from the last SA-preamble symbol at a predetermined interval can be used for transmission of the LBS location beacon. Accordingly, since one symbol from each of a plurality of contiguous superframes can be used for transmission of the LBS location beacon, a total of three symbols can be used as LBS symbols for transmission of the LBS location beacon. If each of the LBS symbol is divided into three carrier sets, respectively, the corresponding LBS zone will support a total of nine reuse patterns for the LBS location beacon.

In FIG. 19, a plurality of superframes are included in one LBS zone, and symbols shifted from SA-preamble symbols within each of the plurality of contiguous superframes at a predetermined interval are used for transmission of the LBS location beacon. Referring to FIG. 19, the LBS zone is configured by a total of three contiguous superframes, and the symbols shifted from three SA-preamble symbols within each superframe at a predetermined interval are used for transmission of the LBS location beacon, whereby a total of 3*3=9 symbols in the LBS zone can be used for transmission of the LBS location beacon. If each of the LBS symbols is divided into three carrier sets, respectively, the corresponding LBS zone will support a total of twenty-seven reuse patterns for the LBS location beacon.

As described with reference to FIG. 17 to FIG. 19, the symbols to which the LBS location beacon can be allocated may be varied per cell. For example, the position of the symbol on which the LBS location beacon is transmitted can be defined as follows.

$$\text{position of LBS location beacon in a frame} = \text{mod}(\text{cell-ID}, \text{shift\_offset}_{symbol})$$ [Math FIG. 3]

In this case, shift_offset$_{symbol}$ may be a value which is previously defined, or may be a value signaled through the MAC control message, the SFH, or the PA-preamble. The shift_offset$_{symbol}$ may be one or more OFDMA symbols. At this time, since the SFH is allocated next to the first symbol of the first frame F0 within the superframe, it is required that the LBS location beacon should not collide with the SFH. To this end, in case of the first frame F0 within the superframe, the position to which the LBS location beacon is allocated can be defined as follows.

$$\text{position of LBS location beacon in 1}^{st}\text{ frame} = \text{mod}(\text{cell-ID}, \text{shift\_offset}_{symbol}) + \text{number of SFH OFDMA symbols}$$ [Math FIG. 4]

In the same manner as the Math FIG. 2, shift_offset$_{symbol}$ may be a value which is previously defined, or may be a value signaled through the MAC control message, the SFH, or the PA-preamble. In the same manner as the Math FIG. 3, the shift_offset$_{symbol}$ may mean one or more OFDMA symbols. In the Math FIG. 4, number of SFH OFDMA symbols means the number of symbols to which the SFH is allocated.

In the mean time, the LBS location beacon may be allocated to another subframe not the subframe to which the existing SA-preamble is allocated. The existing preambles are transmitted from the first symbol of the frames within the superframe. In other words, the existing preambles are transmitted from the first subframe of each frame. In order to avoid contention with the existing preambles, the LBS location beacon may be allocated to another subframe different from the existing subframe, and the LBS subframe to which the LBS location beacon can be allocated may be varied per cell. The LBS subframe to which the LBS location beacon can be allocated can be defined as follows.

$$\text{subframe for LBS location beacon} = \text{mod}(\text{cell-ID}, \text{shift\_offset}_{subframe})$$ [Math FIG. 5]

In this case, shift_offset$_{subframe}$ may be a value which is previously defined, or may be a value signaled through the MAC control message, the SFH, or the PA-preamble. In the same manner as the Math FIG. 5, the shift_offset$_{subframe}$ may be one or more subframes. In order to avoid contention between other preambles and the LBS location beacon, shift_offset$_{subframe}$ may be defined so as not to exceed the number of superframes constituting one frame.

In the mean time, in the embodiments of FIG. 17 to FIG. 19, the number of reuse patterns supported by each LBS zone depends on the number of symbols that participate in transmission of the LBS location beacon in the corresponding LBS zone. Also, in the same manner as (b) of FIG. 14 to (d) of FIG. 14, (b) of FIG. 15 to (d) of FIG. 15, and (b) of FIG. 16 to (d) of FIG. 16, each LBS symbol is divided into several carrier sets, and the number of reuse patterns depends on how carrier sets participate in LBS location transmission. For example, referring to (c) of FIG. 14 or (c) of FIG. 15 and (c) of FIG. 16, if each of the LBS symbols is divided into three carrier sets but one of the carrier sets, i.e., one frequency segment cannot be used for transmission of the LBS location beacon for transmission of the control channel, the LBS zone supports two reuse patterns per LBS symbol. In the embodiments of FIG. 17 to FIG. 19, the number R of reuse patterns supported by each LBS zone can be expressed as follows.

$$R = N_{LBS\ symbol\ in\ LBS\ zone} \times N_{carrier\ set\ in\ LBS\ symbol}$$ [Math FIG. 6]

In this case, $N_{LBS\ symbol\ in\ LBS\ zone}$ represents the number of symbols that can be used in transmission of the LBS location beacon, and $N_{carrier\ set\ in\ LBS\ symbol}$ represents the number of frequency segments of each LBS symbol that can be used in transmission of the LBS location beacon.

It has been described that the frequency bandwidth of a LBS symbol is divided into one or three frequency segments. However, the number of segments within the LBS symbol, i.e., the number of carrier sets can be varied. If the number of carrier sets is increased, the number of reuse patterns within the LBS zone will be increased.

As described in the embodiments of FIG. 9 to FIG. 13, the position for the LBS location beacon transmitted from each base station in the embodiments of FIG. 14 to FIG. 19 may be regardless of a cell, or may be defined uniquely in association with a cell. In other words, among a plurality of reuse patterns within the LBS zone, the pattern to which the LBS location beacon is actually allocated may be defined regardless of the cell or in association with the cell. The base station can signal information indicating the SA-preamble symbol and/or frequency segment, to which the LBS location beacon is actually located, among a plurality of allocation positions for the LBS location beacon, to the user equipment. In other words, the base station can signal information indicating the reuse pattern, to which the LBS location beacon is actually allocated, among the plurality of reuse patterns within the LBS zone, to the user equipment. The information can be transmitted to the user equipment through the MAC control message, the SFH or the PA-preamble. If the position for the LBS location beacon is defined uniquely in association with the cell, the user equipment may identify the position for the LBS location beacon by acquiring cell ID from the existing SA-preamble.

Cell-Specific LBS Location Beacon Allocation

Hereinafter, the embodiments that the LBS location beacon is allocated to the LBS reuse pattern based on FIG. 9 to FIG. 16 cell-specifically will be described later with reference to Table 1 to Table 10. In Table 1 to Table 10, LBS symbol indexes within the LBS zone are numbers starting from 0, sequentially given to symbols (hereinafter, referred to as LBS symbols) to which the LBS location beacon can be allocated in the LBS zone. Accordingly, the LBS symbol index 0 means the first LBS symbol within the LBS zone, and the LBS symbol index 1 means the second LBS symbol within the LBS zone. Also, in Table 1 to Table 10, segments n (carrier set n) are numbers starting from 0, sequentially given to frequency segments of the LBS symbol. For example, segment 0 means the first segment of frequency segments of the symbol, and segment 1 means the second segment, and segment 2 means the third segment.

Each base station according to the present invention can transmit the LBS location beacon from the LBS zone to the user equipment depending on cell ID given to the corresponding base station.

FIG. 9 to FIG. 19 illustrate the embodiments related to the position to which the LBS location beacon can be allocated from one LBS zone. In other words, if the LBS zone supports n reuse patterns, the number of positions to which the LBS location beacon can be allocated becomes n. As described above, in the present invention, one reuse pattern means a resource area defined by one symbol and one carrier set. Since orthogonality exists between the reuse patterns, if neighboring base stations transmit the LBS location beacon through different reuse patterns, inter-LBS location beacon interference can be reduced. This improves hearability of the user equipment for the LBS location beacon, thereby enabling more exact location measurement. If the LBS location beacon is transmitted cell-specifically, it is likely that the reuse pattern on which actual transmission of the LBS location beacon occurs is varied according to a cell. For this reason, it is advantageous in that interference between neighboring base stations can be reduced.

In the wireless system, each cell has its ID. In the present invention, all cell IDs that can be used in the wireless system are grouped by R preamble locations/LBS groups (PLG), wherein R represents the number of reuse patterns supported by the LBS zone.

Referring to FIG. 10, FIG. 13 and (b) FIG. 16, the LBS zone of FIG. 10, FIG. 13 and (b) of FIG. 16 supports a total of nine reuse patterns. Each of the nine reuse patterns can be defined by one symbol and one carrier set as illustrated in Table 1 or Table 2.

TABLE 1

| LBS symbol index in LBS zone | Segment0 (CarrierSet0) | Segment1 (CarrierSet1) | Segment2 (CarrierSet2) |
|---|---|---|---|
| 0 | PLG0 | PLG3 | PLG6 |
| 1 | PLG1 | PLG4 | PLG7 |
| 2 | PLG2 | PLG5 | PLG8 |

TABLE 2

| LBS symbol index in LBS zone | Segment0 (CarrierSet0) | Segment1 (CarrierSet1) | Segment2 (CarrierSet2) |
|---|---|---|---|
| 0 | PLG0 | PLG1 | PLG2 |
| 1 | PLG3 | PLG4 | PLG5 |
| 2 | PLG6 | PLG7 | PLG8 |

For example, referring to Table 1 and FIG. 13, if cell-ID of the base station A belongs to PLG0, the base station A transmits the LBS location beacon to the user equipment through the segment 0 of the first LBS symbol of three LBS symbols within the LBS zone. In other words, the base station A replaces the SA-preamble symbol of F3 of SU0 with the LBS symbol, wherein the LBS location beacon is allocated to CarrierSet0 of three carrier sets of the LBS symbol. If cell-ID of another neighboring base station B belongs to PLG8, the base station B replaces the SA-preamble symbol of F3 of SU2 with the LBS symbol, wherein the LBS location beacon is transmitted through CarrierSet2 of three carrier sets of the LBS symbol. If cell-ID of other neighboring base station C belongs to PLG2, the base station C replaces the SA-preamble of F3 of SU2 with the LBS symbol, wherein the LBS location beacon is transmitted through CarrierSet0 of three carrier sets of the LBS symbol. The user equipment can perform location measurement through the LBS location beacons received from the base stations A, B and C.

Referring to (c) of FIG. 14, the LBS zone of (c) of FIG. 14 supports a total of ten reuse patterns. Each of the ten reuse patterns can be defined by one symbol and one carrier set as illustrated in Table 3 or Table 4.

TABLE 3

| LBS symbol index in LBS zone | Segment1 (CarrierSet1) | Segment2 (CarrierSet2) |
| --- | --- | --- |
| 0 | PLG0 | PLG1 |
| 1 | PLG2 | PLG3 |
| 2 | PLG4 | PLG5 |
| 3 | PLG6 | PLG7 |
| 4 | PLG8 | PLG9 |

TABLE 4

| LBS symbol index in LBS zone | Segment1 (CarrierSet1) | Segment2 (CarrierSet2) |
| --- | --- | --- |
| 0 | PLG0 | PLG5 |
| 1 | PLG1 | PLG6 |
| 2 | PLG2 | PLG7 |
| 3 | PLG3 | PLG8 |
| 4 | PLG4 | PLG9 |

For example, referring to Table 4 and (c) of FIG. 14, if cell-ID of the base station A belongs to PLG0, the base station A transmits the LBS location beacon to the user equipment through frequency segment 1 of the first LBS symbol of five LBS symbols within the LBS zone. In other words, the base station A transmits the LBS location beacon through the second symbol of SF0 within F3 of SU0, especially through CarrierSet1 of three carrier sets of the second symbol. If cell-ID of another neighboring base station B belongs to PLG8, the base station B transmits the LBS location beacon through the fifth symbol of SF0 within F3 of SU0, especially through CarrierSet2 of the fifth symbol. If cell-ID of other neighboring base station C belongs to PLG2, the base station C transmits the LBS location beacon through the fourth symbol of SF0 within F3 of SU0, especially through CarrierSet1 of three carrier sets of the fourth symbol. The user equipment can measure location parameters through the LBS location beacons received from the base stations A, B and C.

The LBS location beacon may be allocated in accordance with another type depending on the number of reuse patterns supported by the LBS zone. For example, if the number of reuse patterns supported by the LBS zone is 12, the LBS location beacon may be allocated depending on Table 5 or Table 6.

TABLE 5

| LBS symbol index in LBS zone | Segment0 (CarrierSet0) | Segment1 (CarrierSet1) | Segment2 (CarrierSet2) |
| --- | --- | --- | --- |
| 0 | PLG0 | PLG1 | PLG2 |
| 1 | PLG3 | PLG4 | PLG5 |
| 2 | PLG6 | PLG7 | PLG8 |
| 3 | PLG9 | PLG10 | PLG11 |

TABLE 6

| LBS symbol index in LBS zone | Segment0 (CarrierSet0) | Segment0 (CarrierSet0) | Segment0 (CarrierSet0) |
| --- | --- | --- | --- |
| 0 | PLG0 | PLG4 | PLG8 |
| 1 | PLG1 | PLG5 | PLG9 |
| 2 | PLG2 | PLG6 | PLG10 |
| 3 | PLG3 | PLG7 | PLG11 |

Whether a specific cell belongs to what PLG can be determined by various methods. Some embodiments can be described as follows.

$$PLGi = \text{floor}\left(\text{cell-ID} / \text{ceil}\left(\frac{\text{total number of cell-IDs}}{R}\right)\right) \quad \text{[Math FIG. 7]}$$

The base station that belongs to a cell having specific cell-ID can identify PLG, on which an LBS location beacon of the base station is transmitted, in accordance with the Math FIG. 7. For example, it is supposed that the number of cell-IDs available is 768. In this case, each cell within the wireless system has one of cell IDs from 0 to 767. If the number of reuse patterns supported by the LBS zone is 3, cell ((total number of cell-IDs)/R) is cell(768/3)=256, which means that 768 cell-IDs are grouped by 256. Accordingly, the base station having cell-IDs from 0 to 255 transmits the LBS location beacon of the corresponding cell to the user equipment through PLG0 corresponding to the first PLG of three PLGs. Also, the base station having cell-IDs from 256 to 511 transmits the LBS location beacon of the corresponding cell to the user equipment through PLG1 corresponding to the second PLG of three PLGs. Moreover, the base station having cell-IDs from 512 to 767 transmits the LBS location beacon of the corresponding cell to the user equipment through PLG2 corresponding to the third PLG of three PLGs.

Referring to Table 1 and FIG. 13, the LBS zone of FIG. 13 supports nine reuse patterns, wherein 768 cell-IDs are grouped into nine PLGs. In this case, cell ((total number of cell-IDs)/R) is cell(768/9)=86, which means that the 768 cell-IDs are grouped by 86. For example, if the base station A has cell-ID of 85, floor(85/86)=0 is obtained, whereby the base station transmits the LBS location beacon to a user equipment within the corresponding coverage through PLG0. Referring to Table 1 and FIG. 13, the base station A transmits the LBS location beacon to the user equipment through the SA-preamble symbol of F3 within SU0, especially through CarrierSet0 of three carrier sets of the LBS symbol.

$$PLGi = \text{floor}\left(\text{cell-ID} / \text{floor}\left(\frac{\text{total number of cell-IDs}}{R}\right)\right) \quad \text{[Math FIG. 8]}$$

The base station that belongs to a cell having specific cell-ID may identify PLG, on which an LBS location beacon of the base station is transmitted, in accordance with the Math FIG. 8. If the number of reuse patterns supported by the LBS zone is 9, cell ((total number of cell-IDs)/R) is cell (768/9)=85, which means that 768 cell-IDs are grouped by 85. For example, if the base station A has cell-ID of 85, floor(85/85)=1 is obtained, whereby the base station transmits the LBS location beacon to the user equipment within the corresponding coverage through PLG1. Referring to Table 1 and FIG. 13, the base station A replaces the SA-preamble symbol of F3 within SU1 with the LBS symbol, wherein the LBS location beacon is transmitted through CarrierSet0 of three carrier sets of the LBS symbol.

$$PLGi=\mathrm{mod}(\text{cell-ID},R) \quad \text{[Math FIG. 9]}$$

In the mean time, cell-IDs may be grouped by modulo operation of FIG. 9, for example. Referring to Table 1 and FIG. 13, the base station A having cell-ID of 85 transmits the corresponding LBS location beacon to the user equipment through mod(85,9)=PLG4. In other words, the base station A replaces the SA-preamble symbol of F3 within SU1 with the LBS symbol, wherein the LBS location beacon is transmitted through CarrierSet1 of three carrier sets of the LBS symbol.

In Table 1 to Table 6, it has been described that the reuse patterns have one-to-one correspondency with the PLGs. In Table 1 to Table 6, the reuse pattern i corresponds to PLGi. However, one PLG number may be mapped into a plurality of reuse patterns. In this case, a plurality of reuse patterns mapped into one PLG number exist in one LBS zone. The reuse patterns having one PLG number may further be identified by either frequency segment or LBS symbol.

Referring (c) of FIG. 14 illustrating that one frequency segment does not participate in transmission of the LBS location beacon for transmission of the control channel, the correspondency between the reuse patterns and PLGs can be defined, for example, as illustrated in Table 7 or Table 8.

TABLE 7

| LBS symbol index in LBS zone | Segment1 (CarrierSet1) | Segment2 (CarrierSet2) |
|---|---|---|
| 0 | PLG0 | PLG1 |
| 1 | PLG1 | PLG2 |
| 2 | PLG2 | PLG3 |
| 3 | PLG3 | PLG4 |
| 4 | PLG4 | PLG0 |

TABLE 8

| LBS symbol index in LBS zone | Segment1 (CarrierSet1) | Segment2 (CarrierSet2) |
|---|---|---|
| 0 | PLG0 | PLG1 |
| 1 | PLG2 | PLG3 |
| 2 | PLG4 | PLG0 |
| 3 | PLG1 | PLG2 |
| 4 | PLG3 | PLG4 |

For another example, it is supposed that four LBS symbols exist within the LBS zone. It is also supposed that each LBS symbol is identified by three frequency segments and the number of reuse patterns is 12. In this case, the correspondency between reuse patterns and PLGs can be defined, for example, as illustrated in Table 9 or Table 10.

TABLE 9

| LBS symbol index in LBS zone | Segment0 (CarrierSet0) | Segment0 (CarrierSet0) | Segment0 (CarrierSet0) |
|---|---|---|---|
| 0 | PLG0 | PLG3 | PLG2 |
| 1 | PLG1 | PLG0 | PLG3 |
| 2 | PLG2 | PLG1 | PLG0 |
| 3 | PLG3 | PLG2 | PLG1 |

TABLE 10

| LBS symbol index in LBS zone | Segment0 (CarrierSet0) | Segment0 (CarrierSet0) | Segment0 (CarrierSet0) |
|---|---|---|---|
| 0 | PLG0 | PLG1 | PLG2 |
| 1 | PLG3 | PLG0 | PLG1 |
| 2 | PLG2 | PLG3 | PLG0 |
| 3 | PLG1 | PLG2 | PLG3 |

In Table 7 to Table 10, the reuse patterns are grouped into Q depending on the number of frequency segments to which the LBS location beacon can be allocated, and then PLGs are mapped into the grouped reuse patterns. For example, if the number of reuse patterns supported by the LBS zone is 12 and the number of frequency segments to which the LBS location beacon can be allocated is 3, Q becomes 12/3=4. Q reuse patterns exist per group, and PLG0 to PLBQ−1 are allocated to the Q reuse patterns. In this example, Q can be set to the number of LBS symbols within the LBS zone.

Referring to Table 7 and (c) of FIG. 14, since the number of frequency segments to which the LBS location beacon can be allocated per LBS symbol is 2, ten reuse patterns are grouped into five, and PLG0 to PLG4 are sequentially mapped into five reuse patterns. PLG0 mapped into LBS symbol within a specific frequency segment can be cyclic shifted with a specific offset value. For example, referring to Table 7, PLG0 can be mapped into one of four LBS symbols in each frequency segment. In segment 1 (CarrierSet1 in (c) of FIG. 14), PLG0 is mapped into the first LBS symbol. In segment 2 (CarrierSet2 in (c) of FIG. 14), PLG0 is mapped into the fifth LBS symbol in accordance with offset values of four OFDMA symbols.

In Table 7 to Table 10, cell-ID that belongs to PLGi can be defined, for example, by Math FIG. 10 below.

$$\text{cell-ID}_{PLGi}=256n+Idx_{PLGi} \quad \text{[Math FIG. 10]}$$

In this case, n represents segment ID (carrier set index), and $Idx_{PLGi}$ represents running index increased from i to 255 as much as 1, wherein i has a value of 0 to Q−1. Q can be set to the number of LBS symbols within the LBS zone.

For example, referring to Table 7, the LBS location beacon is transmitted by the frequency segment 0 or 1. Since five LBS symbols exist within the LBS zone, i has any one of values of 0 to 4. The base station that transmits the LBS location beacon through PLG2 comprised of the segment 1 (n=1) and the third LBS symbol (i=2) has one of cell-IDs from 256*1+2=258 to 256*1+255=511.

Table 1 to Table 10 are only exemplary, and the mapping relationship of the reuse patterns, the LBS symbols, the carrier sets and PLGi may be defined differently from Table 1 to Table 10.

As described in Table 1 to Table 10, if the corresponding base station transmits the LBS location beacon on a specific LBS symbol and a specific carrier set according to its cell-ID, the user equipment can identify the position for the LBS location beacon of the corresponding base station based on the cell-ID acquired from the conventional SA-preamble. In other words, the position for the LBS location beacon is implicitly signaled to the user equipment through the cell-ID transmitted by the conventional SA-preamble. In addition, the base station may explicitly signal information indicating a corresponding LBS symbol and subcarrier set within the superframe to the user equipment through the MAC control message, the SFH or the PA-preamble.

In the mean time, it has been described that the reuse factor of the LBS symbol is 1 or 3. However, this is only exemplary, and various reuse factors of the LBS symbol may be supported. Also, if various reuse factors are supported, the method for transmitting the LBS location beacon may be varied depending on cell ID or sector ID. For example, the number of segments of the LBS symbol may be varied for cells having one cell ID depending on parameters such as size or coverage of a cell, the number of base stations within the cell, and a reuse factor.

Mapping of LBS Location Beacon into Subcarriers

Figure 20:
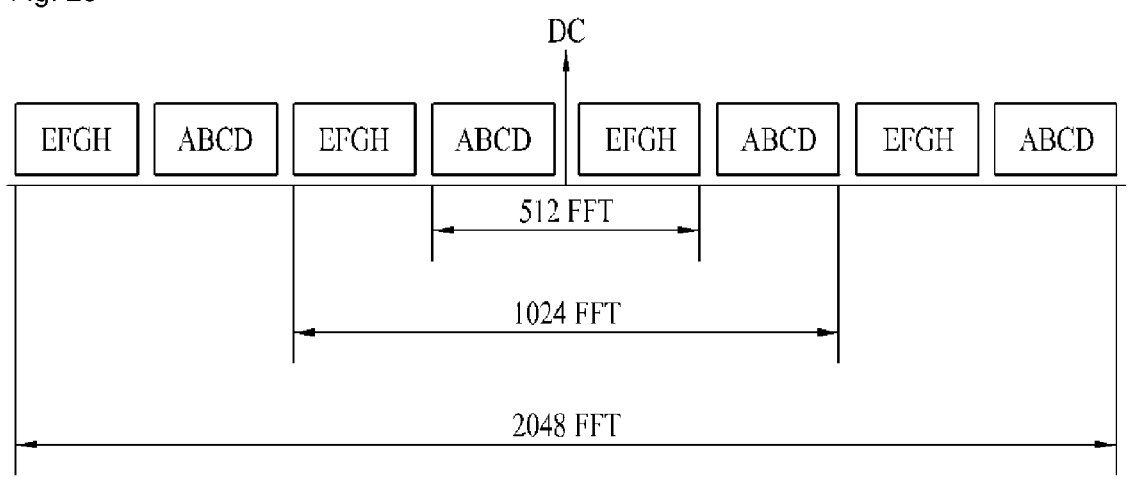
FIG. 20 is a diagram illustrating an example of mapping LBS location beacon with subcarriers.

FIG. 20 is a diagram illustrating an example of mapping LBS location beacon, i.e., LBS-preamble signal to subcarriers.

Referring to FIG. 20, the number of subcarriers allocated to the LBS location beacon can be varied depending on the size of FFT (Fast Fourier Transform). For example, the LBS location beacon may have 144, 288 and 576 lengths for 512-FFT, 1024-FFT, and 2048-FFT.

If subcarrier indexes 256, 512 and 1024 are reserved for 512-FFT, 1024-FFT and 2048-FFT as DC components, subcarriers allocated to a specific LBS location beacon can be defined by the following Math FIG. 11.

$$CarrierSet_n = n + 3 \cdot k + 40 \cdot \frac{N_L}{144} + \text{floor}\left(\frac{2 \cdot k}{N_L}\right)$$ [Math FIG. 11]

In this case, n is a carrier set index indicating segment ID. Segment 0 uses carrier set 0, segment 1 uses carrier set 1, and segment 2 uses carrier set 2. $N_L$ represents the number of subcarriers allocated for the LBS location beacon, and has values of 144, 288 and 576 for 512-FFT, 1024-FFT and 2048-FFT. Also, k is a miming index from 0 to $N_L$.

In case of 512-FFT, the LBS location beacon of 288 bits is divided into eight sequence subblocks A, B, C, D, E, F, and H each having a length of 36 bits, and then can be mapped into subcarriers. Also, after A, B, C, D, E, F, and H are sequentially modulated, they are mapped into LBS location beacon subcarrier set corresponding to segment ID. In case of FFT greater than 512-FFT, basic subblocks A, B, C, D, E, F, and H are repeated in the same order and then mapped into the LBS location beacon subcarrier set. For example, in case of 1024-FFT, E, F, G, H, A, B, C, D, E, F, G, H, A, B, C, and D are modulated and then sequentially mapped into the LBS location beacon subcarrier set.

If the other part of a frequency segment except for the part used for transmission of the control channel is used for transmission of the LBS location beacon, the LBS location beacon can be mapped into the subcarriers by using tone-dropping. Tone-dropping is a method for forming an irregular system bandwidth by dropping a specific band interval based on the existing regular system bandwidth in accordance with intention of a system maker. For example, regular system bandwidths of 5 MHz, 10 MHz and 20 MHz exist in the IEEE 802.16m system, and the system maker can use irregular system bandwidths between 5 and 20 MHz in accordance with the tone-dropping technique. This bandwidth information can be transmitted through PA-preamble sequence.

The correlation between the system bandwidth and the LBS location beacon will be described. 5 MHz, 10 MHz and 20 MHz corresponding to regular system bandwidths are configured by one or more subbands of four RPUs (72 subcarriers). Also, the LBS location beacon basically includes subblocks of three PRUs (54 subcarriers) as illustrated in FIG. 20. In this case, the LBS location beacon corresponding to the regular system bandwidth of 5 MHz includes a total of eight subblocks of four left subblocks and four right subblocks based on the DC components. Also, the LBS location beacon corresponding to the regular system bandwidth of 10 MHz includes a total of sixteen subblocks of eight left subblocks and eight right subblocks based on the DC components. Moreover, the LBS location beacon corresponding to the regular system bandwidth of 20 MHz includes a total of thirty-two (32) subblocks of sixteen left subblocks and sixteen right subblocks based on the DC components.

As described with reference to (d) of FIG. 14, (d) of FIG. 15 and (d) of FIG. 16, if the LBS location beacon is transmitted through the other bands of a segment except for the band used for transmission of the control channel in the segment, the aforementioned tone-dropping technique can be used for transmission of the LBS location beacon. For example, subblocks of the LBS location beacon can be transmitted through the other bands except for the band used for transmission of the control channel, in accordance with Table 11 below.

TABLE 11

| Index | Tone-dropped nominal channel BW(MHz) | Dropped subblocks | Total number of subblocks | Allocation of sequence subblocks for LBS location beacon |
|---|---|---|---|---|
| 0 | 5 < BW < 6.25 | 8 | 8 | ABCD \| EFGH |
| 1 | 6.25 <= BW < 7.5 | 6 | 10 | HABCD \| EFGHA |
| 2 | 7.5 <= BW < 8.75 | 4 | 12 | GHABCD \| EFGHAB |
| 3 | 8.75 <= BW < 10 | 2 | 14 | FGHABCD \| EFGHABC |
| 4 | 10 <= BW < 11.25 | 16 | 16 | EFGHABCD \| EFGHABCD |
| 5 | 11.25 <= BW < 12.5 | 14 | 18 | DEFGHABCD \| EFGHABCDE |
| 6 | 12.5 <= BW < 13.75 | 12 | 20 | CDEFGHABCD \| EFGHABCDEF |
| 7 | 13.75 <= BW < 15 | 10 | 22 | BCDEFGHABCD \| EFGHABCDEFG |
| 8 | 15 <= BW < 16.25 | 8 | 24 | ABCDEFGHABCD \| EFGHABCDEFGH |
| 9 | 16.25 <= BW < 17.5 | 6 | 26 | HABCDEFGHABCD \| EFGHABCDEFGHA |
| 10 | 17.5 <= BW < 18.75 | 4 | 28 | GHABCDEFGHABCD \| EFGHABCDEFGHAB |
| 11 | 18.75 <= BW < 20 | 2 | 30 | FGHABCDEFGHABCD \| EFGHABCDEFGHABC |

The subblocks dropped in Table 11 mean the number of subblocks included in the bandwidth used for transmission of the control channel. The tone-dropped regular channel bandwidths (BW) mean the other bandwidths of regular bandwidths except for the bandwidth used for transmission of the control channel. The total number of subblocks means the number of maximum subblocks that do not exceed the other bandwidths.

The LBS location beacon is configured by a maximum number of subblocks within the range that do not exceed the size of the bandwidths remaining after tone-dropping. For example, if tone-dropping is applied to the regular bandwidths of 5 MHz to 10 MHz, the LBS location beacon is mapped to the other subblocks except for the number of subblocks dropped for the control channel, among 16 subblocks corresponding to 10 MHz. If tone-dropping is applied to the regular bandwidths of 10 MHz to 20 MHz, the LBS location beacon is mapped to the other subblocks except for the number of subblocks dropped for the control channel, among 32 subblocks corresponding to 20 MHz.

For example, referring to Table 11, if the other resource band except for the control channel has a size between 12.5 MHz and 13.7 MHz, the LBS location beacon is configured by subblocks of a sequence corresponding to index 6. In other words, from the DC component, the LBS location beacon subblocks are mapped into the subcarriers in the order of C, D, E, F, G, H, A, B, C, and D at the left and also mapped into the subcarriers in the order of E, F, G, H, A, B, C, D, E, and F at the right. In this way, the base station can transmit the mapped subblocks to the user equipment.

Table 12 to Table 14 illustrate examples of the LBS location beacon sequence of the subblocks A, B, C, D, E, F, G, and H per segment. Each sequence index is indicated by index q and expressed by hexadecimal. In Table 12 to Table 14, sequences can correspond to segments 0 to 2, respectively. In Table 12 to Table 14, blk represents a subblock constituting each sequence. Table 12 illustrates a sequence of n=0 (segment 0), Table 13 illustrates a sequence of n=1 (segment 1), and Table 14 illustrates a sequence of n=2 (segment 2).

TABLE 12 n = 0 (segment0)

| | | | | blk | | | | |
|---|---|---|---|---|---|---|---|---|
| q | A | B | C | D | E | F | G | H |
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74FB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03F576092 | 06A989824 |
| 8 | 1A5B7278E | 1630D0D82 | 3001EF613 | 34CCF51A1 | 2120C250A | 06893FA2D | 156073692 | 07178CFA7 |
| ... | ... | ... | ... | ... | ... | ... | ... | ... |
| 127 | 1EF89091A | 11A653D2C | 223FC1F42 | 2F7B97B31 | 2CA4EE011 | 00F68767D | 10FE34682 | 018339212 |

TABLE 13 n = 1 (segment1)

| | | | | blk | | | | |
|---|---|---|---|---|---|---|---|---|
| q | A | B | C | D | E | F | G | H |
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| ... | ... | ... | ... | ... | ... | ... | ... | ... |
| 127 | 34F9ACB6B | 384870FF1 | 257A863DE | 34B36BA0F | 3FA3D216B | 27425041B | 0E0DD0BAD | 2E95AD35D |

TABLE 14 n = 1 (segment1)

| | | | | blk | | | | |
|---|---|---|---|---|---|---|---|---|
| q | A | B | C | D | E | F | G | H |
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |

TABLE 14-continued

| | | | | n = 1 (segment1) | | | | |
|---|---|---|---|---|---|---|---|---|
| | | | | blk | | | | |
| q | A | B | C | D | E | F | G | H |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| ... | ... | ... | ... | ... | ... | ... | ... | ... |
| 127 | 34F9ACB6B | 384870FF1 | 257A863DE | 34B36BA0F | 3FA3D216B | 27425041B | 0E0DD0BAD | 2E95AD35D |

As mentioned before, the existing SA-preamble signal can be used as the LBS location beacon of the present invention. In other words, the base station can transmit the corresponding SA-preamble signal to the user equipment at the position to which the LBS location beacon of the base station should be transmitted. The relationship between the corresponding SA-preamble signal transmitted from the base station and cell ID of the base station can be determined in accordance with Math FIG. 12 and Math FIG. 13 below.

$$\text{cell-ID}_n = 256n + Idx \quad \text{[Math FIG. 12]}$$

In this case, n is SA-preamble carrier set index, has any one of values of 0, 1 and 2, and represents segment ID. Idx is determined by the following Math FIG. 13.

$$Idx = 2 \cdot \mathrm{mod}(q, 128) + \mathrm{floor}\left(\frac{q}{128}\right) \quad \text{[Math FIG. 13]}$$

In this case, sequence index q is an integer between 0 and 255. For example, a sequence of subblocks corresponding to a specific sequence index q of specific segment ID can be identified from the sequences of Table 12 to Table 14.

Transmission of LBS Location Beacon from a Plurality of Base Stations

Base stations configured to support the LBS zone can transmit the LBS location beacon through mutual adjustment in accordance with the aforementioned embodiments of the present invention. FIG. 21 to FIG. 24 are diagrams illustrating operation examples among a plurality of base stations that transmit location measurement signals in accordance with the embodiments of the present invention.

The base station can transmit its location measurement signal to user equipment(s) within corresponding coverage. Referring to FIG. 1, the user equipment can receive location measurement signals from the base station A (BS A), the base station B (BS B), and the base station C (BS C). At this time, it is a problem when the BS A, the BS B, and the BS C transmit their LBS location beacon, respectively. Hereinafter, embodiments that neighboring base stations transmit the LBS location measurement signals on a corresponding LBS zone when a base station of a specific cell transmits the LBS location beacon will be described. The embodiments 1 and 2 for signal transmission among a plurality of neighboring base stations according to the present invention will be described based on the embodiment of FIG. 13 corresponding to the first method for transmitting LBS location measurement signals and the embodiment of FIG. 14 corresponding to the method for transmitting LBS location measurement signals. Likewise, the embodiments of FIG. 21 to FIG. 24 can be applied to the other embodiments of the first method and the other embodiments of the second method. According to the embodiments described with reference to FIG. 21 to FIG. 24, since transmission of the LBS location beacon is performed by a plurality of base stations through mutual adjustment, it is advantageous in that the user equipment can easily measure the parameters related to location measurement.

Embodiment 1 for Transmission of LBS Location Measurement Signals by a Plurality of Base Stations Each base station can transmit its LBS location beacon on at least one of reuse patterns within the LBS zone regardless of the operation of the other base stations.

Figure 21:
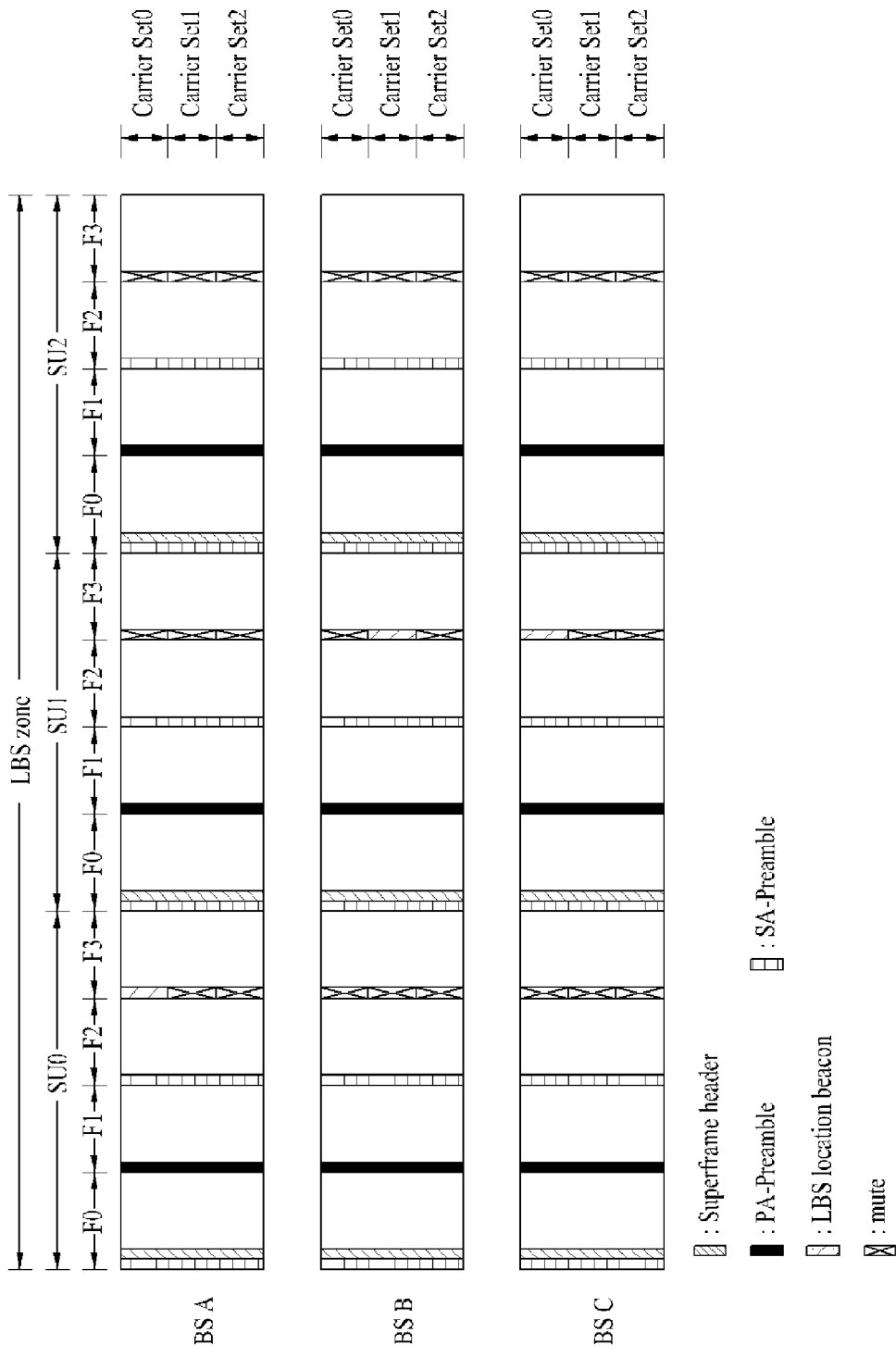
FIG. 21 and FIG. 22 are diagrams illustrating operation embodiment 1 among a plurality of base stations that transmit location measurement signals in accordance with the embodiments of the present invention.

Referring to FIG. 21, for example, at the LBS zone, the BS A transmits the LBS location beacon of the BS A on CarrierSet0 of the first symbol of F3 within SU0, the BS B transmits the LBS location beacon of the BS B on CarrierSet1 of the first symbol of F3 within SU1, and the BS C transmits the LBS location beacon of the BS C on CarrierSet0 of the first symbol of F3 within SU1. At this time, the other reuse patterns to which the LBS location beacon is not actually allocated are all muted.

Figure 22:
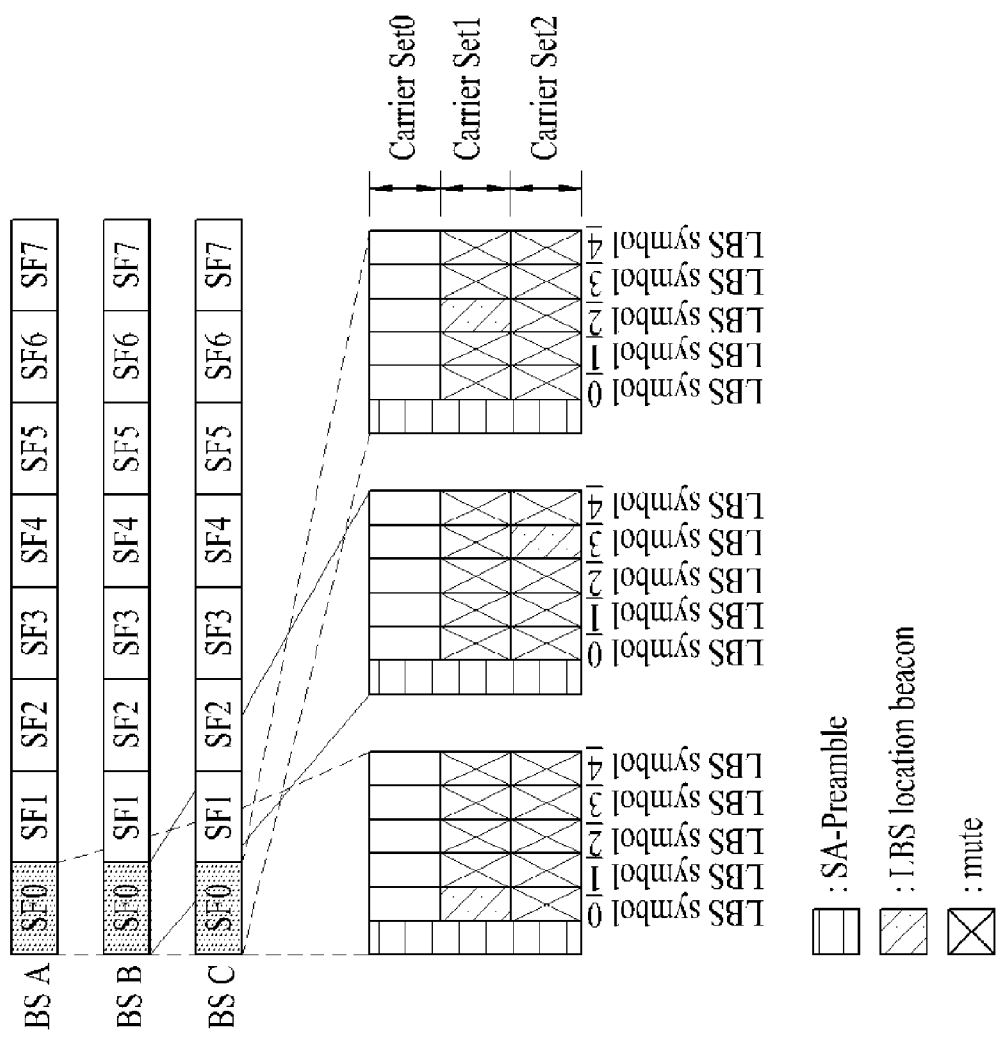

Referring to FIG. 22, for example, the LBS zone can support a total of ten reuse patterns defined by CarrierSet0 and CarrierSet1 and the second symbol to the sixth symbol of one subframe of one frame within one superframe. At the LBS zone, the base station BS A transmits the LBS location beacon through CarrierSet1 of the LBS symbol 0, the base station BS B transmits the LBS location beacon through CarrierSet2 of the LBS symbol 3, and the base station BS C transmits the LBS location beacon through CarrierSet1 of the LBS symbol 2. At this time, the other reuse patterns to which the LBS location beacon is not actually allocated are all muted.

According to the embodiment 1, the user equipment can perform location measurement by receiving the LBS location beacons from each of the BS A, the BS B and the BS C at the LBS zone. Since the BS A, the BS B and the BS C transmit the LBS location beacon on resources orthogonal to one another, there is little interference among the LBS location beacons transmitted from each base station.

Embodiment 2 for transmission of LBS Location Measurement Signals from a Plurality of Base Stations According to the present invention, since each base station transmits the LBS location beacon on a specific symbol and carrier set, there is low possibility that neighboring base stations transmit the LBS location beacon to the same symbol and carrier set. Especially, the possibility is low when the neighboring base stations are scheduled to transmit the LBS location beacon to different symbols and carrier sets. However, in order to lower the possibility of interference among neighboring base stations which occurs due to overlap between symbols and carriers of the LBS location beacon, at the interval where a specific base station actually transmits its LBS location beacon, the neighboring base stations may all mute the reuse patterns of the LBS location beacon.

Figure 23:
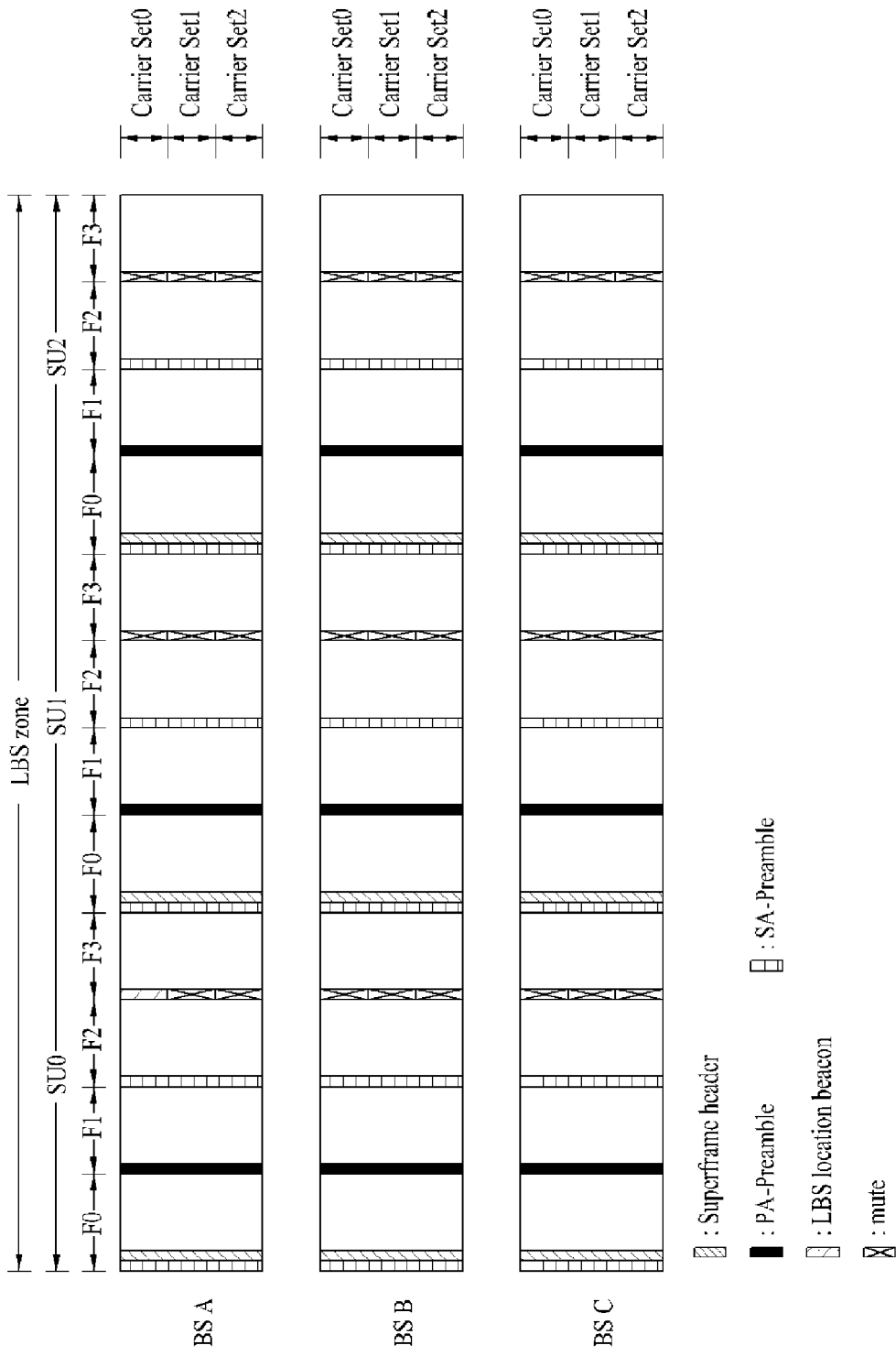
FIG. 23 and FIG. 24 are diagrams illustrating operation embodiment 2 among a plurality of base stations that transmit location measurement signals in accordance with the embodiments of the present invention.
Figure 24:
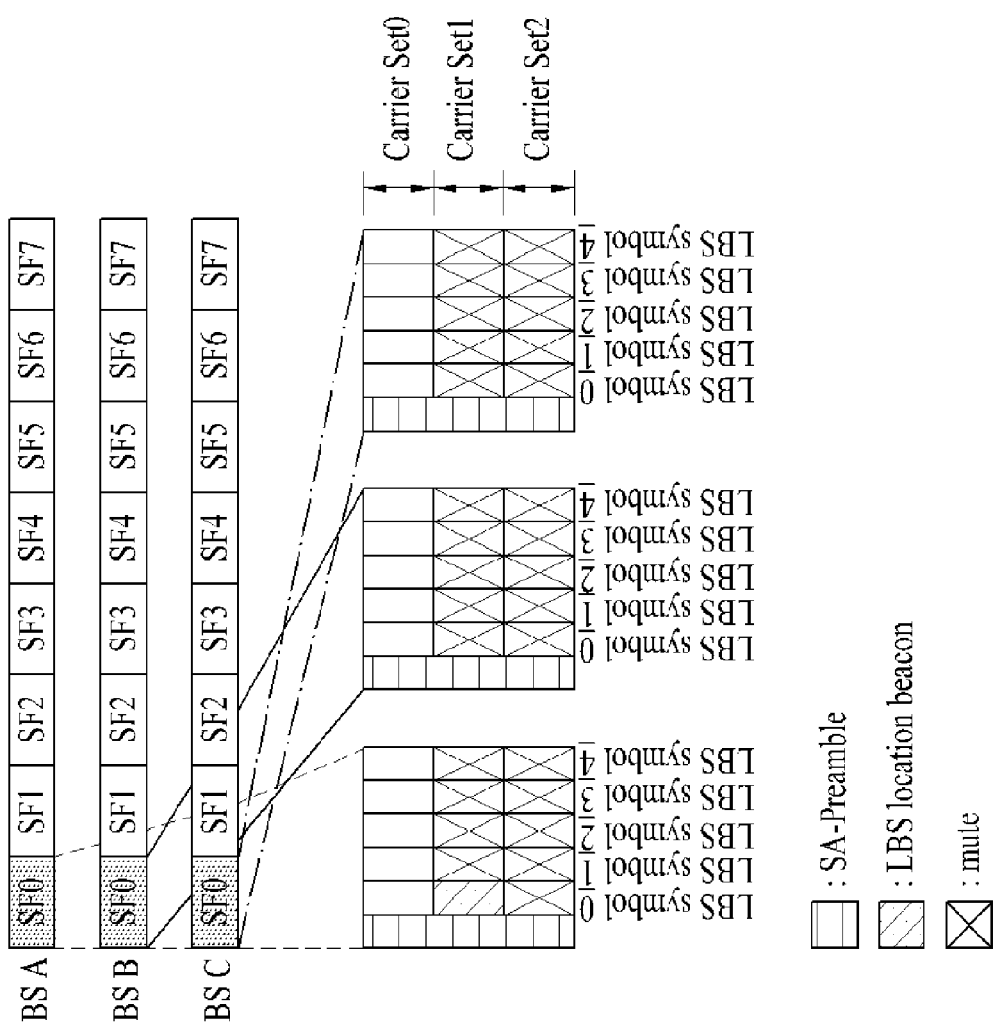

Referring to FIG. 23 and FIG. 24, for example, if the BS A transmits the LBS location beacon, the neighboring base stations BS B and BS C can transmit downlink subframes within the LBS zone to the user equipment in a state that they mute all the reuse patterns for LBS location beacon transmission within the corresponding LBS zone. If the BS B transmits the LBS location beacon, the neighboring base stations BS A and BS C transmit downlink subframes within the LBS zone to the user equipment in a state that they mute all the reuse patterns for LBS location beacon transmission within the corresponding LBS zone. Also, if the BS C transmits the LBS location beacon, the neighboring base stations BS A and BS B transmit downlink subframes within the LBS zone to the user equipment in a state that they mute all the reuse patterns for LBS location beacon transmission within the corresponding LBS zone.

According to the embodiment 2, the user equipment receives the LBS location beacon only transmitted from the BS A at the LBS zone where the BS A transmits the LBS location beacon. Also, the user equipment receives the LBS location beacon only transmitted from the BS B at the LBS zone where the BS B transmits the LBS location beacon. Moreover, the user equipment receives the LBS location beacon only transmitted from the BS C at the LBS zone where the BS C transmits the LBS location beacon.

In the mean time, when a specific cell transmits the LBS location beacon, the base station of all cells except for the base station of the specific cell can optimize performance for location measurement by muting the reuse patterns within the LBS zone to which the LBS location beacon of the specific cell is transmitted. However, a problem occurs in that loss in system throughput increases. Accordingly, the base stations mute the reuse patterns for the LBS location beacon for sites or cells of a certain range and configure a superframe for the other cells like the existing manner in accordance with scheduling among them or transmission schedule. For example, all base stations within a site or tier to which the BS A belongs mute the reuse patterns for the LBS location beacon within the corresponding LBS zone when the BS A transmits the LBS location beacon. However, base stations within a site or tier away from the BS A allocate their LBS location beacons to at least one of the reuse patterns without muting the reuse patterns for LBS location beacon and then transmit the LBS location beacons to the user equipment. Alternatively, the base stations may transmit the LBS location beacon to the user equipment by configuring the superframe like the existing manner without configuring the LBS zone. In the first method for transmitting LBS location measurement signals according to the present invention, the base station away from the BS A can transmit the existing SA-preamble to the user equipment by allocating it as it is without replacing the existing SA-preamble with the LBS location beacon. For another example, in the second method for transmitting LBS location measurement signals according to the present invention, the base station away from the BS A can transmit the LBS location beacon by allocating data or control channel to reuse patterns to which the LBS location beacon can be transmitted, like the existing manner, without allocating the LBS location beacon to the reuse patterns.

According to the embodiment 2 of the present invention, as the LBS location beacon is temporally multiplexed for neighboring base stations, it is advantageous in that detection and measurement of the LBS location beacons transmitted from the plurality of base stations can be simplified.

The operation of the base station that transmits the LBS location beacon in accordance with any one of the embodiments of the present invention and operation of the user equipment that performs location measurement by receiving the LBS location beacon will be described below with reference to FIG. 2 and FIG. 3.

The processor 400b of the base station according to the present invention can configure the LBS zone in accordance with any one of the embodiments of FIG. 5 and FIG. 6. At this time, the processor 400b of the base station can generate MAC control message, SFH or PA-preamble, which includes information indicating whether the LBS zone is enabled, transmission period information of the LBS zone, and/or information indicating location measurement, and can broadcast the generated MAC control message, SFH or the PA-preamble by controlling the transmitter 100b of the base station. The processor 400b of the base station generates information on geographical location of neighboring base stations together with the MAC control message, SFH or PA-preamble, and provides the generated information to the user equipment by controlling the transmitter 100b of the base station. The user equipment may use the information on geographical location of neighboring base stations for triangularization or trilateration for location determination of the user equipment. Also, the processor 400b of the base station may generate information as to location related parameters (for example, RSSI, RD, etc.) to be measured by the user equipment and signal the generated information to the user equipment by controlling the transmitter 100b of the base station.

The processor 400b of the base station, as illustrated in FIG. 7 and FIG. 8, generates a plurality of LBS zones continuously, and transmits the plurality of LBS zones to the user equipment by controlling the transmitter 100b of the base station. The transmitter 100b of the base station and the antenna 500b of the base station transmit superframes constituting the LBS zone to the user equipment under the control of the processor 400b of the base station.

The processor 400b of the base station can control the transmitter 100b of the base station to allocate the LBS location beacon to at least one of the reuse patterns being supported by the LBS zone in accordance with any one of the embodiments of FIG. 9 to FIG. 19.

The subcarrier mappers 130-1 to 130-K are configured to allocate the LBS location beacon to at least one of the reuse patterns based on any one of the embodiments of FIG. 9 to FIG. 19, under the control of the processor 400b of the base station. The processor 400b of the base station can control the subcarrier mappers 130-1 to 130-K to map the subblocks for the LBS collation beacon into the subcarriers of the LBS symbol in accordance with the embodiment of FIG. 20 and/or Table 14.

In this respect, the processor 400b of the base station can determine the reuse pattern on which the LBS location beacon will be transmitted, among the reuse patterns for the LBS location beacon within the LBS zone, regardless of cell/sector, i.e., without considering cell/sector ID. The subcarrier mappers 130-1 to 130-K allocate the LBS location beacon of the base station to the determined reuse pattern under the control of the processor 400b of the base station. At this time, the processor 400b of the base station generates information indicating the reuse pattern to which the LBS location beacon is actually allocated, and transmits the generated information to the user equipment by controlling the transmitter 100b of the base station. In particular, the processor 400b of the base station can generate the MAC control message, the SFH and the PA-preamble to include the information, and can control the transmitter 100b of the base station to transmit them to the user equipment.

In the mean time, the processor 400b of the base station may determine cell-specifically a reuse pattern on which LBS location beacon of the base station is transmitted, e.g., based on the cell-ID. The processor 400b of the base station can generate information indicating the reuse pattern to which the LBS location beacon is actually allocated, and can explicitly transmit the information to the user equipment by controlling the transmitter 100b of the base station. In particular, the processor 400b of the base station can generate the MAC control message, the SFH and the PA-preamble to include the information, and can control the transmitter 100b of the base station to transmit them to the user equipment. Alternatively, the reuse pattern to which the LBS location beacon transmitted from the base station is allocated may implicitly be signaled to the user equipment through the SA-preamble that includes cell ID information.

As described with reference to Table 1 to Table 10, a plurality of cell IDs that can be used in the wireless system to which the base station belongs are grouped depending on the number of reuse patterns being supported by one LBS zone. The base station having the same cell ID allocates the LBS location beacon to the same reuse pattern. When the base station transmits the LBS location beacon cell-specifically, the processor 400b of the base station, as described in Table 1 to Table 10, can control the transmitter 100b of the base station to allocate its LBS location beacon to the LBS symbol and carrier set corresponding to the group to which the corresponding cell belongs. The transmitter 100b of the base station transmits the LBS location beacon to the user equipment through the carrier set at the LBS symbol timing under the control of the processor 400b of the base station.

The LBS location beacon transmitted on the carrier set at the LBS symbol timing may be the existing SA-preamble. In other words, the processor 400b of the base station can control the transmitter 100b of the base station to allocate the SA-preamble corresponding to the cell ID to the LBS symbol and carrier set of the group to which the cell ID of the base station belongs. The transmitter 100b of the base station can transmit the corresponding SA-preamble signal to the user equipment on the LBS symbol and carrier set of the group to which the cell ID belongs, under the control of the processor 400b of the base station.

In the mean time, the processor 400b of the base station can broadcast the LBS location beacon by allocating it to at least one of the reuse patterns within the LBS zone as described in the embodiment 1 of FIG. 21 and FIG. 22, even if a neighboring base station adjacent to the above base station broadcasts the LBS location beacon at the LBS zone. At this time, the processor 400b of the base station can control the transmitter 100b of the base station to mute the other reuse patterns to which the LBS location beacon is actually not allocated. The subcarrier mappers 130-1 to 130-K can be configured to allocate the LBS location beacon to the at least one reuse pattern and drop a signal on the other reuse patterns, under the control of the processor 400b of the base station. In other words, the subcarrier mappers 130-1 to 130-K allocate the LBS location beacon to the LBS symbol and carrier set constituting the at least one reuse pattern within the LBS zone, and do not allocate a signal to the LBS symbol and carrier set corresponding to the remaining reuse patterns within the LBS zone. The transmitter 100b of the base station transmits the LBS location beacon to the user equipment on the carrier set of the reuse pattern, to which the LBS location beacon is actually allocated, at the LBS symbol timing of the reuse pattern, under the control of the processor 400b of the base station. The transmitter 100b of the base station does not transmit a signal on the carrier set at the LBS symbol timing of the reuse pattern to which the LBS location beacon is not allocated.

Also, the processor 400b of the base station can control the transmitter 100b of the base station to mute all of the reuse patterns within the LBS zone as described in the embodiment 2 of FIG. 23 and FIG. 24, if a neighboring base station adjacent to the above base station broadcasts the LBS location beacon at the LBS zone. The subcarrier mappers 130-1 to 130-K can be configured to drop a signal on all of the reuse patterns within the LBS zone where the neighboring base station actually transmits LBS location of the neighboring base station, under the control of the processor 400b of the base station. In other words, the subcarrier mappers 130-1 to 130-K do not allocate a signal to the LBS symbol and carrier set constituting each reuse pattern within the LBS zone where the neighboring base station actually transmits the LBS location beacon of the neighboring base station. The transmitter 100b of the base station does not transmit a signal on the carrier set at the LBS symbol timing of each reuse pattern within the LBS zone where the neighboring base station transmits the LBS location beacon of the neighboring base station, under the control of the processor 400b of the base station.

In accordance with the embodiments of the present invention, the processor 400b of the base station can be configured to perform scheduling for transmission of the LBS location beacon at the LBS zone in conjunction with processors of the other base stations.

In the mean time, the processor 400b of the base station can generate information identifying a neighboring base station to be scanned by the user equipment and a location of the neighboring base station, and can signal the information to the user equipment by controlling the transmitter 100b of the base station.

The user equipment can detect information indicating whether the LBS zone is enabled, transmission period information of the LBS zone, and/or information indicating location measurement, which are included in the MAC control message, the SFH or the PA-preamble, and can scan the LBS location beacon within the corresponding LBS zone. The user equipment can receive the LBS location beacon transmitted from each of a plurality of cells, and can measure its location related parameters, for example, RD, RTD, RSSI, etc., based on the LBS location beacons of the plurality of cells. For example, the user equipment can measure RD and/or RTD of the LBS location beacon transmitted from each cell by using the difference in arrival timing of the LBS location beacons transmitted from each cell. The user equipment can determine its location based on the RD and/or RTD of the LBS location beacon. For another example, the user equipment can calculate the difference between the transmission time and the reception time of the plurality of LBS location beacons received from the plurality of cells. The user equipment can determine its location within the wireless communication system or its location within the communication system that includes the plurality of cells, based on the difference between the transmission time and the reception time of the LBS location beacons. Also, the user equipment may feed the location related parameters back to the base stations that belong to the plurality of cells. The base stations can determine the location of the user equipment based on the location related parameters.

Referring to FIG. 2 and FIG. 3, the receiver 300a of the user equipment can receive the MAC control message, the SFH or the PA-preamble indicating whether the LBS zone is enabled, indicating the transmission period of the LBS zone, and/or indicating location measurement, from the base stations of the cells. The receiver 300a of the user equipment transfers the MAC control message, the SFH or the PA-preamble to the processor 400a of the user equipment. The processor 400a of the user equipment can identify the superframe to which the LBS zone belongs, based on the MAC control message, the SFH or the PA-preamble. Accordingly, the processor 400a of the user equipment can collect the LBS location beacons within the superframe to which the LBS zone belongs. The receiver 300a of the user equipment can receive information on geographical location of neighboring base stations from the above base station and transfer the received information to the processor 400a of the user equipment. The processor 400a of the user equipment can use the information on geographical location of neighboring base stations for triangularization or trilateration for location determination of the user equipment.

The receiver 300a of the user equipment receives the LBS location beacons transmitted from the base stations of the cells through the LBS zone, from the plurality of cells adjacent to the user equipment, in accordance with the aforementioned embodiments of the present invention. The receiver 300a of the user equipment transfers the LBS location beacons to the processor 400a of the user equipment. For location measurement of the user equipment using the LBS location beacon, the user equipment may include a measurement module for measuring the LBS location beacon. The measurement module may be implemented in such a manner that it is included in the receiver 300a of the user equipment or the processor 400a of the user equipment or it exists as a separate independent module. If the base station signals information on cells to be scanned by the user equipment to the user equipment, the processor 400a of the user equipment can control the receiver 300a of the user equipment to receive LBS location beacons by scanning signals from neighboring cells designated by the base station.

The processor 400a of the user equipment can measure location related parameters of the user equipment, for example, RD, RTD, RSSI, etc., based on the LBS location beacon from the neighboring cells. If the user equipment receives the location related parameters designated by the base station from the base station, the processor 400a of the user equipment can measure the location related parameters designated by the base station and report them to the base station by controlling the transmitter 100a of the user equipment.

The processor 400a of the user equipment can be configured to calculate the location of the user equipment within the wireless system that includes the neighboring cells, based on the location related parameters. The processor 400a of the user equipment can control the transmitter 100a of the user equipment to transmit the location related parameters or the calculated location of the user equipment to the base station of the neighboring cells.

For another example, the processor 400a of the user equipment can control the transmitter 100a of the user equipment to feed the location related parameters back to the neighboring cells. The processor 100b of the base station, to which the location related parameters are fed back, can be configured to determine the location of the user equipment based on the location related parameters.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a base station, a mobile station, or other communication device in a wireless communication system.

What is claimed is:

1. A method for transmitting, by a base station, a location measurement signal for a location based service (LBS) in a wireless communication system, the method comprising:
   configuring a location measurement zone for transmitting the location measurement signal;
   transmitting a superframe header (SFH) including information indicating whether or not the location measurement zone is activated;
   determining, based on a cell identity assigned to the base station, an orthogonal frequency division multiplexing access (OFDMA) symbol index from among a plurality of predefined OFDMA symbol indices within the location measurement zone and a carrier set from among a plurality of carrier sets; and
   transmitting the location measurement signal on the determined carrier set and the determined OFDMA symbol index during the location measurement zone,
   wherein the location measurement signal is transmitted by using a secondary advanced preamble of the base station, and
   wherein each of the plurality of predetermined OFDMA symbol indices indicates a first OFDMA symbol of a first subframe of a last frame among first to last frames within a superframe belonging to the location measurement zone.

2. The method of claim 1, wherein the SFH includes information indicating a transmission period of the location measurement zone.

3. A base station for transmitting a location measurement signal for a location based service (LBS) in a wireless communication system, the base station comprising:
   a transmitter configured to transmit a radio signal to a user equipment; and
   a processor configured to:
      configure a location measurement zone for transmitting the location measurement signal,
      control the transmitter to transmit a superframe header (SFH) including information indicating whether or not the location measurement zone is activated,
      determine, based on a cell identity assigned to the base station, an orthogonal frequency division multiplexing access (OFDMA) symbol index from among a plurality of predefined OFDMA symbol indices within the location measurement zone and a carrier set from among a plurality of carrier sets, and
      control the transmitter to transmit the location measurement signal on the determined carrier set and the determined OFDMA symbol index during the location measurement zone,
   wherein the location measurement signal is transmitted by using a secondary advanced preamble of the base station, and
   wherein each of the plurality of predetermined OFDMA symbol indices indicates a first OFDMA symbol of a first subframe of a last frame among first to last frames within a superframe belonging to the location measurement zone.

4. The base station of claim 3, wherein the SFH includes information indicating a transmission period of the location measurement zone.

5. A method for receiving, by a user equipment, a location measurement signal for a location based service (LBS) in a wireless communication system, the method comprising:
- receiving a superframe header (SFH) including information indicating whether or not a location measurement zone is activated; and
- receiving, from a plurality of base stations, location measurement signals of the plurality of base stations on one or more carrier sets among a plurality carrier sets and one or more orthogonal frequency division multiplexing access (OFDMA) symbols among a plurality of predefined OFDMA symbols during the location measurement zone configured for reception of the location measurement signals,
- wherein each of the location measurement signals is received on a carrier set among the plurality of carrier sets and an OFDMA symbol index among the plurality of predefined OFDMA symbol indices during the location measurement zone,
- wherein the OFDMA symbol, in which a location measurement signal of a base station among the plurality of the base stations is received during the location measurement zone, and the carrier set, on which the location measurement signal of the base station is received during the location measurement zone, are determined based on a cell identity assigned to the base station,
- wherein the location measurement signal is received by using a secondary advanced preamble of the base station, and
- wherein each of the plurality of predefined OFDMA symbol indices indicates a first OFDMA symbol of a first subframe of a last frame among first to last frames within a superframe belonging to the location measurement zone.

6. The method of claim 5, wherein the SFH includes information indicating a transmission period of the location measurement zone.

7. A user equipment for receiving a location measurement signal for a location based service (LBS) in a wireless communication system, the user equipment comprising:
- a receiver configured to receive a radio signal; and
- a processor configured to
  - control the receiver to receive a superframe header (SFH) including information indicating whether or not a location measurement zone is activated, and
  - control the receiver to receive, from a plurality of base stations, location measurement signals of the plurality of base stations on one or more carrier sets among a plurality carrier sets and one or more orthogonal frequency division multiplexing access (OFDMA) symbols among a plurality of predefined OFDMA symbols during the location measurement zone configured for reception of the location measurement signals,
- wherein each of the location measurement signals is received on a carrier set among the plurality of carrier sets and an OFDMA symbol index among the plurality of predefined OFDMA symbol indices during the location measurement zone,
- wherein the OFDMA symbol, in which a location measurement signal of a base station among the plurality of the base stations is received during the location measurement zone, and the carrier set, on which the location measurement signal of the base station is received during the location measurement zone, are determined based on a cell identity assigned to the base station,
- wherein the location measurement signal is received by using a secondary advanced preamble of the base station, and
- wherein each of the plurality of predetermined OFDMA symbol indices indicates a first OFDMA symbol of a first subframe of a last frame among first to last frames within a superframe belonging to the location measurement zone.

8. The user equipment of 7, wherein the SFH includes information indicating a transmission period of the location measurement zone.

* * * * *